US008150111B2

(12) United States Patent
Borland et al.

(10) Patent No.: US 8,150,111 B2
(45) Date of Patent: Apr. 3, 2012

(54) METHODS, SYSTEMS, AND COMPUTER PROGRAM PRODUCTS FOR PROCESSING THREE-DIMENSIONAL IMAGE DATA TO RENDER AN IMAGE FROM A VIEWPOINT WITHIN OR BEYOND AN OCCLUDING REGION OF THE IMAGE DATA

(75) Inventors: David Borland, Chapel Hill, NC (US); John Clarke, Chapel Hill, NC (US); Russell M. Taylor, II, Chapel Hill, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 924 days.

(21) Appl. No.: 11/886,207

(22) PCT Filed: Mar. 15, 2006

(86) PCT No.: PCT/US2006/009331
§ 371 (c)(1),
(2), (4) Date: Jun. 23, 2008

(87) PCT Pub. No.: WO2006/099490
PCT Pub. Date: Sep. 21, 2006

(65) Prior Publication Data
US 2009/0103793 A1 Apr. 23, 2009

Related U.S. Application Data
(60) Provisional application No. 60/662,042, filed on Mar. 15, 2005.

(51) Int. Cl.
*G06K 9/00* (2006.01)
(52) U.S. Cl. ........................................................ 382/128
(58) Field of Classification Search ........... 382/128–134
See application file for complete search history.

(56) References Cited

U.S. PATENT DOCUMENTS
6,310,620 B1   10/2001   Lauer et al.
(Continued)

FOREIGN PATENT DOCUMENTS
WO    WO 2006/099490 A1    9/2006
(Continued)

OTHER PUBLICATIONS

Notification of Transmittal of the International Search Report and the Written Opinion of the International Searching Authority, or the Declaration for International Application No. PCT/US08/03634 (Jul. 2, 2008).

Lee et al., "CT Arthrography and Virtual Arthroscopy in the Siagnosis of the Anterior Cruciate Ligament and Meniscal Abnormalities of the Knee Joint," Korean Journal of Radiology, vol. 5, No. 1, pp. 47-54 (Mar. 2004).

(Continued)

*Primary Examiner* — Dixomara Vargas
(74) *Attorney, Agent, or Firm* — Jenkins, Wilson, Taylor & Hunt, P.A.

(57) ABSTRACT

Methods, systems, and computer program products for processing three-dimensional image data to render an image from a viewpoint within or beyond an occluding region of the image data are disclosed. According to one method, a set of three-dimensional image data is accessed. The image data includes image data for a surface of interest and image data for a region occluding the surface of interest from a desired viewpoint. The viewpoint may be within or beyond the occluding region. A plurality of rays is cast from the viewpoint to the surface. Along each ray, an occlusion determination is made independent from a volume rendering transfer function definition to render voxels within the occluding region as transparent or partially transparent. The volume rendering transfer function is applied along a portion of each ray outside of the occluding region to render voxels defining surface of interest as visible. The voxels that define the surface are displayed as visible. The voxels within the occluding region are shown in a transparent or partially transparent manner.

41 Claims, 25 Drawing Sheets

U.S. PATENT DOCUMENTS

| | | | |
|---|---|---|---|
| 6,771,263 B1 | 8/2004 | Behrens et al. | |
| 6,990,169 B2 | 1/2006 | Claus et al. | |
| 7,016,116 B2* | 3/2006 | Dolgoff | 359/630 |
| 7,256,780 B2* | 8/2007 | Williams et al. | 345/424 |
| 7,492,523 B2* | 2/2009 | Dolgoff | 359/630 |
| 7,646,540 B2* | 1/2010 | Dolgoff | 359/630 |
| 7,830,381 B2* | 11/2010 | Lundstrom et al. | 345/428 |
| 7,889,194 B2* | 2/2011 | Engel et al. | 345/419 |
| 7,890,155 B2* | 2/2011 | Burns et al. | 600/407 |
| 7,936,930 B2* | 5/2011 | Lundstrom et al. | 382/232 |
| 7,961,187 B2* | 6/2011 | Borland et al. | 345/424 |
| 2002/0113787 A1 | 8/2002 | Ray et al. | |
| 2002/0122038 A1 | 9/2002 | Cowperthwaite | |
| 2005/0195190 A1* | 9/2005 | Williams et al. | 345/424 |
| 2005/0228250 A1* | 10/2005 | Bitter et al. | 600/407 |

FOREIGN PATENT DOCUMENTS

WO      WO 2008/115534 A1     9/2008

OTHER PUBLICATIONS

Tory et al., "A Parallel Coordinates Style Interface for Exploratory Volume Visualization," IEEE Transactions on Visualization and Computer Graphics, vol. 11, No. 1, pp. 1-10 (Mar. 2004).
Viola et al., "Importance-Driven Volume Rendering," IEEE Visualization 2004, Austin, TX, pp. 1-7 (2004).
Hadwiger et al., "High-Quality Two-Level Volume Rendering of Segmented Data Sets on Consumer Graphics Hardware," IEEE Visualization 2003, pp. 1-8 (2003).
Diepstraten et al., "Interactive Cutaway Illustrations," Computer Graphics Forum, vol. 22, No. 3, pp. 1-10 (2003).
Hönigmann et al., "Adaptive Design of a Global Opacity Transfer Function for Direct Volume Rendering of Ultrasound Data," IEEE Visualization 2003, Seattle, pp. 489-496 (2003).
Kindlmann et al., "Curvature-Based Transfer Functions for Direct Volume Rendering: Methods and Applications," IEEE Visualization 2003, Seattle, pp. 1-5 (2003).
Kruger et al., "Acceleration Techniques for GPU-based Volume Rendering," IEEE Visualization 2003, Seattle, WA, pp. 1-6 (2003).
Nagy et al., "Depth-Peeling for Texture-Based Volume Rendering," 11th Pacific Conference on Computer Graphics and Applications, pp. 1-5 (2003).
Sherbondy et al., "Fast volume Segmentation with Simultaneous Visualization using Programmable Graphics Hardware," IEEE Visualization 2003, Seattle, WA, pp. 1-6 (2003).
McTavish et al., "Multi-Detector Row CT Urography: Comparison of Strategies for Depicting the Normal Urinary Collecting System," Radiology, vol. 225, No. 3, pp. 783-790 (Dec. 2002).
Caoili et al., "Urinary Tract Abnormalities: Initial Experience with Multi-Detector Row CT Urography," Radiology, vol. 222, No. 2, pp. 353-360 (Feb. 2002).
Fielding et al., "Tumor Detection by Virtual Cystoscopy with Color Mapping of Bladder Wall Thickness," Journal of Urology, vol. 167, pp. 559-562 (Feb. 2002).
Diepstraten et al., "Transparency in Interactive Technical Illustration," Computer Graphics Forum, vol. 21, No. 3, pp. 1-11 (2002).
Everitt, "Interactive Order-Independent Transparency," Tech Report, Nvidia Corporation, pp. 1-11 (2002).
Kniss et al., "Interactive Volume Rendering using Multi-Dimensional Transfer Functions and Direct Manipulation Widgets," IEEE Visualization 2001, San Diego, pp. 1-8 (2001).
Ebert et al., "Volume Illustration: Non-Photorealistic Rendering of Volume Models," Proceedings of IEEE Visualization 2000, IEEE Computer Society Press, pp. 1-8 (Oct. 2000).
Hladùvka et al., "Curvature-Based Transfer Functions for Direct Volume Rendering," Proceedings of SCCG 2000, pp. 1-8 (2000).
Kindlmann et al., "Semi-Automatic Generation of Transfer Functions for Direct Volume Rendering," Proceedings of IEEE Symposium on Volume Visualization 1998, pp. 1-8 (1998).
Parker et al., "Interactive Ray Tracing for Isosurface Ray Casting," IEEE Visualization 1998, pp. 233-238, p. 538 (1998).
McNicholas et al., "Excretory Phase CT Urography for Opacification of the Urinary Collecting System," American Journal of Radiology, vol. 170, pp. 1261-1267 (May 1998).
Interrante et al., "Conveying the 3d Shape of Smoothly Curving Transparent Surfaces via Texture," IEEE Transactions on Visualization and Computer Graphics, vol. 3, No. 2, pp. 98-117 (Apr.-Jun. 1997).
Tam et al., "Volume Rendering of Abdominal Aortic Aneurysms," Visualization '97, Phoenix, AZ, pp. 1-9 (Mar. 31, 1997).
Diefenbach, "Pipeline Rendering: Interaction and Realism through Hardware-Based Multi-Pass Rendering," University of Pennsylvania, Department of Computer Science, Ph.D. Dissertation (1996).
Rheingans, "Opacity-Modulating Triangular Textures for Irregular Surfaces," Proceedings of Visualization '96, IEEE Computer Society, pp. 1-8 (1996).
Hemminger et al., "Clinical Applications of Real-Time Volume Rendering," SPIE Medical Imaging, pp. 1-12 (1995).
Levoy, "Display of Surfaces from Volume Data," IEEE Computer Graphics and Applications, vol. 8, No. 3, pp. 1-10 (Feb. 1988).
Notification Concerning Transmittal of International Preliminary Report on Patentability (Chapter I of the Patent Cooperation Treaty) for International Application No. PCT/US2006/009331 (Sep. 27, 2007).
Kaufman et al., "Virtual Colonoscopy," Communications of the ACM, vol. 48, No. 2, pp. 37-41 (Feb. 2005).
Sahin et al., "Virtual MR Arthroscopy of the Wrist Joint: A New Intraarticular Perspective," Skeletal Radiology, vol. 33, pp. 9-14 (2004).
Kniss et al., "Gaussian Transfer Functions for Multi-Field Volume Visualization," IEEE Visualization Conference 2003, pp. 497-504 (2003).
Sears et al., "Prospective Comparison of Computerized Tomography and Excretory Urography in the Initial Evaluation of Asymptomatic Microhematuria," Journal of Urology, vol. 168, pp. 2457-2460 (Dec. 2002).
Choi et al., "Efficient Volumetric Ray Casting for Isosurface Rendering," Computers & Graphics, vol. 24, No. 4, pp. 661-670 (2000).
Wan et al., "Volume Rendering Based Interactive Navigation within the Human Colon," IEEE Visualization '99, pp. 397-400 (1999).
Weishaupt et al., "Virtual MR Arthroscopy: New Insights into Joint Morphology," Journal of Magnetic Resonance Imaging, vol. 9, pp. 757-760 (1999).
Applegate, "Three-Dimensional MR Arthrography of the Shoulder: An Intraarticular Perspective," American Journal of Radiology, vol. 171, pp. 239-241 (Jul. 1998).
Lin et al., "An Efficient Volume-Rendering Algorithm with an Analytic Approach," The Visual Computer, vol. 12, No. 10, pp. 515-526 (1996).
Zuiderveld et al., "Clinical Evaluation of Interactive Volume Visualization," IEEE Visualization, pp. 367-370 (1996).
Mammen, "Transparency and Antialiasing Algorithms Implemented with the Virtual Pixel Maps Technique," IEEE Computer Graphics and Applications, vol. 9, No. 4, pp. 43-55 (Jul. 1989).
Notification of Transmittal of International Preliminary Report on Patentability for International Application No. PCT/US08/03634 (Mar. 3, 2010).
Notification of Transmittal of the International Search Report or the Declaration for Internation Application No. PCT/US06/09331 (Aug. 10, 2006).
Cootes et al., "Active Shape Models-Smart Snakes," In Proceedings of Eropean Conference on Computer Vision, pp. 484-498 (1998).
Sethian, J.A., "A Marching Level Set Metod for Monotonically Advancing Fronts," In Proceedings of National Academy of Sciences (1996).
Cootes et al., "Active Appearance Models," In Proceedings of British Machine Vision, pp. 266-274 (1992).
Kass et al., "Snakes: Active Contour Models," International Journal of Computer Vision, vol. 1, Issue 4, pp. 321-331 (1988).
Osher et al., "Fronts Propragating With Curvature Dependent Speed: Algorithms Based on Hamilton-Jacobi Formulations," Journal of computational Physics, vol. 79, pp. 12-48 (1988).
Canny, J.S., "Computational Approach to Edge Detection," IEEE Transactions on Pattern Analysis and Machine Intelligence, vol. 8, Issue 6, pp. 679-698 (1986).
Notice of Allowance and Fee(s) Due for U.S. Appl. No. 12/532,373 (Feb. 7, 2011).

* cited by examiner

 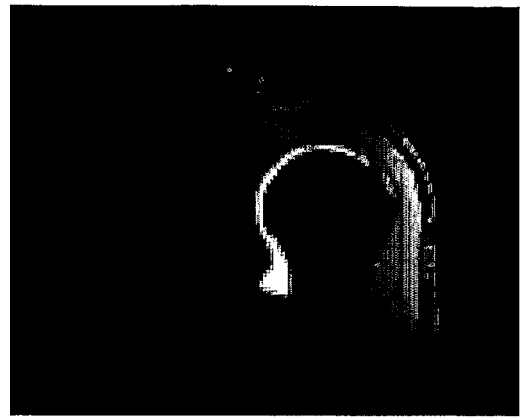
FIG. 3A    FIG. 3B
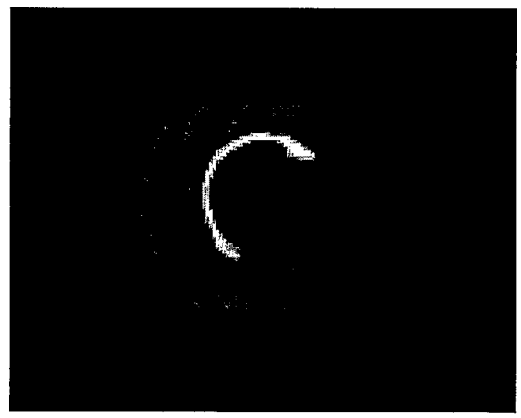
FIG. 3C

FIG. 4A
FIG. 4B
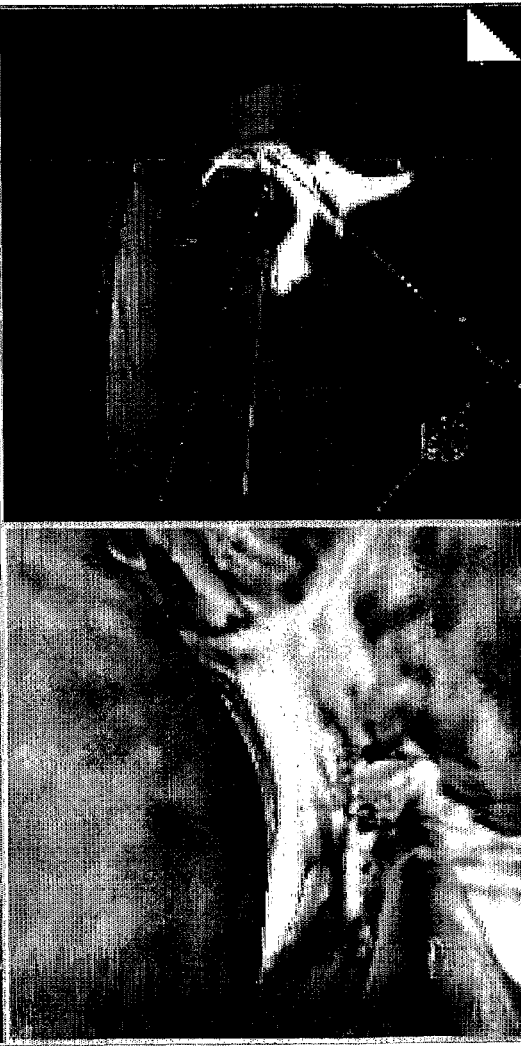
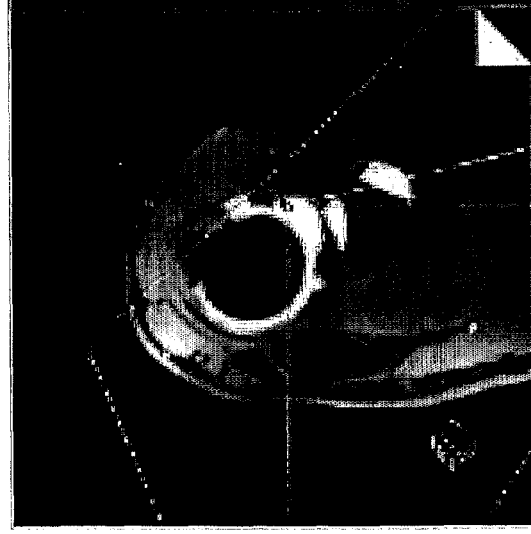
FIG. 4C
FIG. 4D

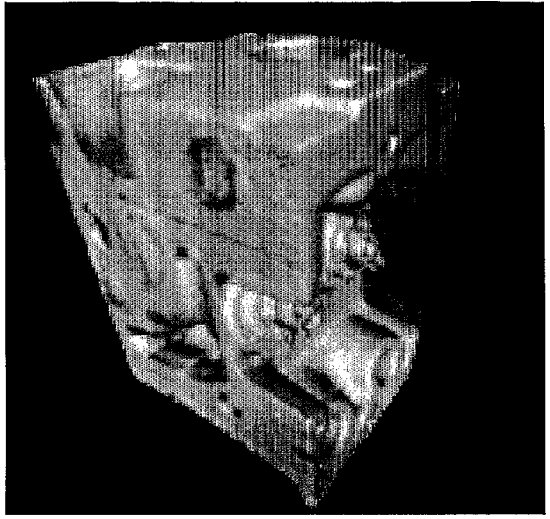 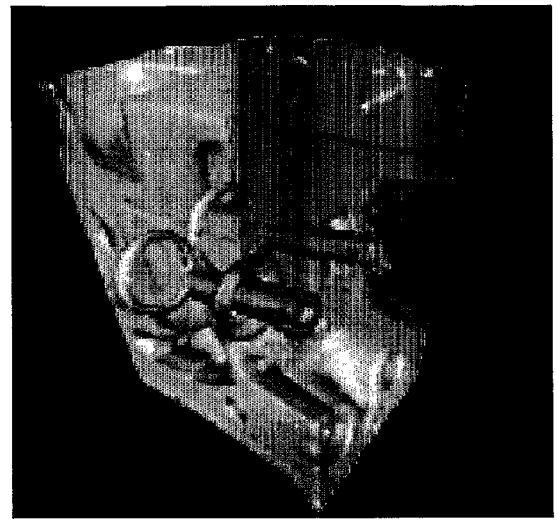
FIG. 12A    FIG. 12B
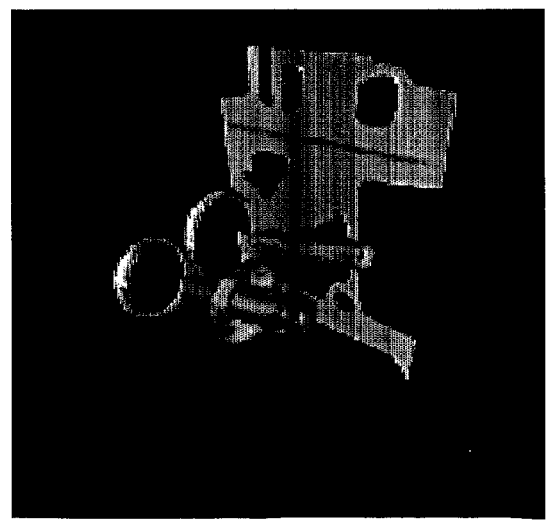
FIG. 12C

METHODS, SYSTEMS, AND COMPUTER PROGRAM PRODUCTS FOR PROCESSING THREE-DIMENSIONAL IMAGE DATA TO RENDER AN IMAGE FROM A VIEWPOINT WITHIN OR BEYOND AN OCCLUDING REGION OF THE IMAGE DATA

RELATED APPLICATIONS

This application claims the benefit of U.S. Provisional Patent Application Ser. No. 60/662,042, filed Mar. 15, 2005; the disclosure of which is incorporated herein by reference in its entirety.

GOVERNMENT INTEREST

This invention was made with U.S. Government support under Grant No. P41 EB002025-21 RS/RMT awarded by the National Institutes of Health. Accordingly, the U.S. Government has certain rights in the invention.

TECHNICAL FIELD

The subject matter described herein relates to processing three-dimensional image data to render images of surfaces and regions of interest. More particularly, the subject matter described herein relates to methods, systems, and computer program products for processing three-dimensional image data to render an image from a viewpoint within or beyond an occluding region of the image data.

BACKGROUND ART

In computer graphics, rendering refers to the conversion of data into a desired format for display on a display device. For example, it may be desirable to obtain an image of an object, define a viewpoint, and render a new image of the object from the viewpoint. Producing images of an object from different viewpoints may be useful in medical applications for disease diagnosis, disease staging, and surgical planning. In non-medical applications, such as engineering applications, it may be desirable to render images of objects from different viewpoints for analysis and design purposes.

One type of rendering used to process three-dimensional image data is referred to as volume rendering. Volume rendering involves defining a viewpoint and casting rays from the viewpoint to surfaces or regions of interest in the scene. Voxel color and intensity are accumulated or recorded at each point along each ray. The accumulated voxel color and intensity values are used to render the final image from the selected viewpoint. However, as will be described in more detail below, one problem with conventional volume rendering is that occluded surfaces or regions cannot be rendered in the final image, except from constrained viewpoints from which these surfaces or regions are viewable.

In medical applications, 3D display of medical data sets is an increasingly useful tool. Viewing 3D reconstructions of objects from magnetic resonance imaging (MRI) and computerized tomography (CT) data is more natural and intuitive than mentally reconstructing these objects from orthogonal slices of the data, especially with the increase in the size of datasets due to ever-increasing scanner resolutions. When displaying such data sets using volume rendering, appropriate selection of the transfer function is critical for determining which features of the data will be displayed. For applications such as virtual arthroscopy (VA), however, even a careful selection of an appropriate transfer function is not sufficient to display entire objects of interest within a joint from a single viewpoint. In VA, due to the close proximity of surfaces in a joint, radiologists have found existing methods lacking for obtaining desired views of features of interest. It may be desirable to enable radiologists to obtain views exterior to the space between the bone and cartilage surfaces ("joint space") for viewing entire areas of interest. Such views are impossible using standard volume rendering because the surfaces occlude each other from viewpoints outside the joint space. Radiologists have found a similar problem when using standard volume rendering for virtual urography (VU) studies in which the physician wishes to obtain views of the interior of the kidney collecting system (a sack called the renal pelvis, the ureter, and the bladder). In this case, a view from outside the kidney collecting system showing the interior is impossible to obtain using standard volume rendering, as the outer surface occludes the inner volume.

Volume Rendering

Interactive volume rendering has had a long history since its first description.[22] Kruger and Westermann describe hardware-accelerated volume renderings[21] and Hadwiger et al. show how to perform rapid multi-technique rendering of pre-segmented volumetric data sets on commodity graphics hardware.[11] Occlusion problems encountered when viewing entire volumes require classification and selection of which portions of the data to display.

The most general method of classification is specifying a transfer function to determine the color and opacity of voxels in the volume. The transfer function can be set to display isosurfaces in volume data.[3, 23, 27] Recent research on volume rendering has focused on the design of complex transfer functions. Interactive[17, 19] and automatic[20] techniques have been developed for the construction of multidimensional transfer functions that incorporate first and second derivates to define surfaces.[13, 18] Such work has led to an algorithm to automatically estimate opacity transfer functions to display tissue interfaces in noisy 3D ultrasound data.[14] A parallel-coordinates interface that enables the user to efficiently search the large-dimensional parameter space, keeping track of the most effective settings and indicating nearby likely candidates is described by Tory et. al.[33] However, none of these methods determine which portions of the volume to cull independently from the transfer function definition, retaining the full range of transfer function control.

When viewing volume data, unimportant portions of the volume often occlude areas of interest. A technique for view-dependent transparency, which aims to automatically produce translucent surfaces similar to technical illustrations, is described by Diepstraten et al.[5] In a later work, techniques for automatically producing breakaway and cutaway illustrations of nested surfaces are described[6]. These illustrations remove portions of geometry that occlude the interior surfaces as opposed to rendering those portions as a translucent material. Most relevant to the VA problem is the work of Viola et al.,[34] which produces importance-driven volume rendering that highlights features of interest and automatically subdues the display of occluding volumes using one of several possible techniques. These techniques are effective for pre-segmented volumes in which there exists a hierarchy of importance among objects. The problem of accelerating volume segmentation while rendering using graphics hardware has also been addressed.[30]

Depth Peeling

Depth peeling is a frame-buffer-based technique that can achieve order-independent transparency when rendering polygons.[4, 8, 24] Depth peeling techniques have been extended to texture-based volume rendering of isosurfaces, originating the term volumetric depth peeling.[38] It may be desirable to extend these techniques to the more general case of ray-based volume rendering, retaining full transfer function control (not just isosurfaces), therefore enabling the full range of volumetric effects to be applied (including effects that simulate directionally-illuminated surface rendering).

Medical Applications

Volume rendering has been demonstrated to improve effectiveness in clinical settings compared to 2D and 3D views on film.[12, 39] A volume-rendering-based interactive virtual colonoscopy navigation system is undergoing clinical validation.[35] A combined surface and volume rendering approach for virtual colonoscopy that also indicates which region of the surface have been surveyed and which have not yet been examined has been described.[16] Volume visualization systems have also been used for the study of aortic aneurysms.[32] The feasibility of 3D rendering of joint surfaces and pathology using MRI and CT data sets has been demonstrated by several authors.[1, 29, 36, 37] Such techniques provide real-time interaction and evaluation of joints for VA. However, this evaluation of joint surfaces is constrained to views within the joint space, as is the case in conventional arthroscopy. Fielding et al. describe a system for color coding hand-segmented bladder walls by thickness for tumor detection,[9] a task similar to that of VU.

Viewing a joint surface from a viewpoint within the joint space is analogous to viewing a wall behind a furnace from the area between the wall and the furnace. From such a constrained viewpoint, many of the features of the wall are not easily seen. In order to obtain a better image of the wall, it may be desirable to render the image from a viewpoint within the furnace so that the portion of the furnace between the viewpoint and the wall is shown in a transparent or partially transparent manner. However, conventional imaging techniques have been limited to viewpoints from which the surface being rendered is visible.

Accordingly, there exists a need for improved methods, systems, and computer program products for processing three-dimensional image data to render an image from a viewpoint within or beyond an occluding region of the image data.

SUMMARY

According to one aspect, the subject matter described herein includes a method for processing three-dimensional image data to render an image from a viewpoint within or beyond an occluding region of the image data. The method includes accessing a set of three-dimensional image data including image data for a surface of interest and image data for a region that occludes the surface of interest from a desired viewpoint. The desired viewpoint may be within or beyond the occluding region. A plurality of rays is cast from the viewpoint to the surface of interest. Along each ray, an occlusion determination is made, independently from a volume rendering transfer function, to render voxels in the occluding region as transparent or partially transparent. The volume rendering transfer function is applied along a portion of each ray outside of the occluding region to render voxels defining the surface or region as visible. The voxels that define the surface or region are displayed in a visible manner from the viewpoint and the voxels within the occluding region are shown in transparent or a partially transparent manner.

The subject matter described herein includes techniques that extend conventional volume rendering to allow rendering of occluded surfaces from within or beyond occluding regions. The techniques described herein include volumetric depth peeling, second surface rendering, flexible occlusion rendering, and diagnostic rays. The following paragraphs summarize each of these techniques. Additional detail and examples of each of these techniques will be described below.

Volume Rendering

The techniques described herein use volume rendering to render three-dimensional images from desired viewpoints. Volume rendering was first described by Levoy in 1988. Volume rendering may use a ray casting algorithm to cast one or more rays for each pixel into the volume. The volume can be thought of as a 3D image, where each volume element, or voxel, is analogous to a 2D image pixel. The voxel intensities indicate some material property at point in space. For computerized tomography (CT), the material property is radiodensity (relative transparency to the passage of X-rays through a material), measured in Hounsfield Units. For magnetic resonance imaging (MRI), the property may be a function related to the number of hydrogen atoms in each voxel. Different materials have distinct ranges of intensities. As the ray is cast into the volume, it traverses through the voxels along its path and accumulates color and opacity based on the color and opacity transfer functions. The transfer function determines how visible various intensities are, and thus, how visible the various materials are. The transfer function can be set to show only the voxels containing intensities in the range of the material in which a viewer is interested.

For virtual arthroscopy, it may be desirable to inspect cartilage surfaces (and ligaments and tendons, which are around the same range of intensities) for damage (technically, derangements). In order to show the cartilage in the final image, the transfer function may be set to show material with intensities in the cartilage range as visible. However, using conventional volume rendering alone, viewing of the cartilage surfaces is constrained to viewpoints within the "joint-space" between the surfaces in the joint, which severely restricts the views possible and requires maneuvering the virtual camera across the entire surface of the joint for inspection. It would be more desirable to view the entire shoulder socket, for example, for quick inspection, but this would require a viewpoint from within the humeral head, and the material of the humeral head occludes such a view. No transfer function setting will get rid of the front cartilage surface to allow viewing of the back cartilage surface, as the surfaces are of the same material. Making the front surface partially transparent will also make the back surface partially transparent, and only makes a confusing image.

It is possible to place a clipping plane in front of the camera to get rid of some of the occluding material. However, for complex geometry, such as that which occurs within joints, no single clipping plane will suffice to show the entire area of interest. It is also possible to segment the surface of interest. However, manual segmentation is extremely tedious, requiring drawing on many slices to segment out the material of interest. Automatic segmentation might be possible, but can be very slow and prone to mistakes.

In addition, segmentation is only one step in the process of displaying an occluded surface or region. The segmented data must still be rendered. For example, if segmentation is performed to render an image of the shoulder socket without rendering the humeral head, the ability to view the humeral head is lost. If both the humeral head and the socket are maintained in the segmented data set, some method must be used to determine which surface to show. In this case, the segmented data could be used as part of flexible occlusion rendering (FOR) (described below) for determining occlusion relationships, replacing the thresholding step.

Second Surface Rendering

One technique described herein that avoids the above-described difficulties is referred to as second surface rendering. Second surface rendering or (SSR) utilizes the contrast agent that is routinely injected into joints for viewing MRIs. The contrast agent is very bright compared to the material in the joint. SSR is an extension to the standard volume rendering algorithm. Rays are cast and color and opacity are accumulated, just as with standard volume rendering. However, for each voxel, there is a test to determine if the voxel intensity is above a fixed threshold. This threshold represents the lowest value of the range of contrast intensities. If the voxel intensity is above the threshold, the accumulated color and opacity are reset to zero, getting rid of the occluding material. Standard volume rendering then resumes, without performing the threshold test. This ensures that the second surface (e.g., the cartilage on the glenoid of the shoulder joint) is rendered. In general, it is preferable to set the threshold epsilon (a small amount) above the maximum intensity of the material being rendered so that the reset is triggered even if there is only a very small amount of contrast (lower contrast signal) between the two surfaces.

With SSR, a surface can be viewed from the far side of the contrast, or from within the contrast, and the surface of interest will be visible. Second surface rendering can also be used to sequentially present multiple images from adjacent viewpoints within an occluding region to produce a video-like fly though view of the occluded surface. For example, in VA applications, a virtual camera can fly from inside the humeral head into the socket, turn around, and see the humeral head, as the algorithm automatically determines the occlusion relationships view-dependently.

Volumetric Depth Peeling

A more general approach to rendering images of surfaces from within regions defined by occluding objects is referred to herein as volumetric depth peeling (VDP). VDP uses the same basic algorithm as SSR, but has some additional features. SSR is therefore a specific implementation of VDP. Depth peeling is a term from raster-based computer graphics for removing depth-layers of polygonal geometry view-dependently. The term volumetric depth peeling was originated in work limited to texture-based volume rendering of isosurfaces. An isosurface is a surface where all pixels have the same intensity values. However, isosurfaces do not in general create accurate anatomical structures from CT and especially MRI data. Also, the texture-based isosurface method will always peel away to the designated depth layer, which is not always desirable for medical fly-through purposes. Volumetric depth peeling as used herein avoids this difficulty by only resetting the transfer function at least once along each ray when it is desirable to exclude one or more surfaces from the final image that have the same range of intensity values as the surface desired to be rendered.

Additional Features

The subject matter described herein for rendering images of surfaces may have the following features in addition to those provided by second surface rendering and volumetric depth peeling:

Rendering the $3^{rd}$, $4^{th}$, $5^{th}$, etc. or the last surface (in general, the nth surface, where n is an integer defined by the user so that other surfaces of the same intensity as the desired surface are shown in a transparent or partially transparent manner, and the nth surface is shown in a visible manner, in images with multiple surfaces of the same intensity values that occlude each other). The nth surface may be the last surface in a group of surfaces that occlude each other or any surface between the first and last surfaces. This approach is useful for joints such as the wrist, where there can be multiple small bones occluding the surface of interest.

Instead of accumulating color and opacity and resetting, refraining from accumulating color and opacity until hitting the threshold. This approach will increase the speed at which a surface of interest can be rendered. Rays that do not reach the threshold will therefore be rendered black (or can be tagged with another color selected by the user).

When accumulating color and opacity before reaching the threshold, modulating the accumulated color and opacity instead of resetting to zero. This enables the first surface or region to be partially transparent, and the second surface or region to be rendered fully opaque. Different opacities can be assigned to the same material based on an occlusion determination.

When accumulating color and opacity, using different transfer functions for regions on the near and far sides of the threshold. Using different transfer functions on the different sides of the threshold allows the same material to be rendered differently based on the occlusion determination.

Rather than using an upper threshold to reset the transfer function, a lower threshold can be used. Such a technique may be useful for viewing CT images of bone fractures, as the fluid between the bones is dark compared to the bones.

With the fixed threshold technique, problems occur when insufficient separation exists between the cartilage layers. In such a case, the threshold may never be reached, so a hole is rendered if operating under a feature where contrast is used to trigger opacity and color accumulation. If the transfer function is modified to begin rendering upon encountering cartilage, only the near surface will be visible. Other methods of determining when to reset can be employed. For example, a fixed threshold may be set near the lower value of the material being rendered. Once that threshold has been reached, the algorithm performs a search for the first local maximum along the ray (which should lie between the cartilage surfaces). This method works well for filling in the holes, but is not very robust to noise. The filled-in hole can therefore have dubious anatomical validity. Pixels rendered using this method can be displayed in a color that is different from surrounding pixels to indicate potentially lower anatomical validity.

Rather than using a fixed threshold to trigger resetting or turning on of the volume rendering transfer function, a gradient-based method can be used. For example, the gradient or rate of change in pixel intensity can be calculated along a ray. If the rate of change suddenly increases, this sudden increase can trigger resetting or turning on of the transfer function.

One contribution of VDP (and SSR) is the separation of occlusion determination from the color and opacity transfer functions and the ability to do different things for the same material based on whether it is occluding or occluded.

Flexible Occlusion Rendering

The above-described "hole" problem illustrates the need for an extension of the techniques described above to use image data from different sources (or from image data computationally derived from the original image) when rendering a surface of interest. The use of image data from one dataset to trigger or control the transfer function used to render the image in another different dataset is referred to herein a flexible occlusion rendering (FOR). VDP can be thought of as a subset of FOR. With FOR, the basic concept is to further separate occlusion determination from the opacity and transfer functions by calculating occlusion on a different dataset than the one used for rendering.

In one example, the dataset used to determine when to reset the transfer function may be a filtered version of the dataset for which rendering is being performed. For example, a smoothed version of the data can be used to determine the occlusion. However, it may not be desirable to render a smoothed version of the data, as some anatomical features may be lost as a result of the filtering. Using a filtered version of the data to identify the occlusion may work well in combination with the local maxima-finding VDP algorithm, as smoothing reduces the noise. Another possibility would be to determine occlusion using a dataset that has had some mathematical morphology operations applied to it. Mathematical morphology operations are similar to smoothing, but instead of averaging, they perform other statistics, such as taking the maximum value over a small area. This would increase the size of the contrast region to help fill in holes. Again, it would not be desirable to render the filtered data, as anatomical structures may be lost.

VDP and SSR can be seen as doing the exact same thing, but the dataset being used for occlusion determination is a thresholded version of the original data. Because determining the threshold is so computationally inexpensive, however, there is no need to pre-calculate a separate dataset.

Another approach to flexible occlusion rendering is to use datasets obtained by different sensors or devices to identify the occlusion and perform the rendering. For example, the occlusion may be identified using a CT image, and the surface may be rendered from an MRI image of the same region. In another example, different MRI sequences or different CT images may be used for occlusion identification and surface rendering. MRIs can be tuned to bring out different features of the data, depending on various parameters. For example, an MRI dataset may have good voxel resolution, which is necessary for high-quality rendering and determining small features in general. The MRI dataset may also be tuned to give good contrast between soft tissue types. It may be possible to design an MRI sequence that is very sensitive to contrast, and completely (mostly) insensitive to anything else. The above-described thresholding technique can be used on the tuned dataset (any signal means contrast) and the original MRI dataset can be used for rendering to illustrate subtle differences in tissue types.

Two ideas being presented herein are the further separation of occlusion determination from the transfer function settings of the material being rendered (occlusion determination is performed on a different dataset) and the realization that datasets that might have little use for human viewing can be useful for the computer performing 3D reconstruction.

Diagnostic Rays

Another rendering technique described herein is referred to as diagnostic rays. Diagnostic rays are the same rays used in the above-described techniques to identify the occluding object and the surface of interest that is behind the occluding region. Such rays may be used to identify regions of biochemical or other abnormality within an anatomical structure by setting the transfer function to start collecting pixel color and intensity values when the region of abnormality is detected. Rather than terminating the ray at the surface of interest, the ray may continue for some fixed length within the surface. Once the region of abnormality is detected, it can be displayed in any suitable manner, such as changing the color of the surface, making the surface partially transparent there to show the pockets of abnormal material, rendering the surface transparent show the pockets of abnormal material, etc.

The subject matter described herein for processing three-dimensional image data may be implemented using a computer program product comprising computer executable instructions embodied in a computer readable medium. Exemplary computer readable media suitable for implementing the subject matter described herein include disk memory devices, chip memory devices, application specific integrated circuits, programmable logic devices, and downloadable electrical signals. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which:

FIGS. 3A-3C illustrate three slices of MRI data of a shoulder along three orthogonal axes;

FIGS. 4A-4D illustrate the position of a virtual camera for virtual arthroscopy flythroughs of a shoulder joint;

FIG. 12A is an image of an engine generated using standard volume rendering;

FIG. 12B is an image of engine where some of the engine is shown in a partially transparent manner and generated using volumetric depth peeling according to an embodiment of the subject matter described herein;

FIG. 12C is an image of an engine generated using volumetric depth peeling where external parts of the engine have been culled away;

DETAILED DESCRIPTION

Figure 1A:
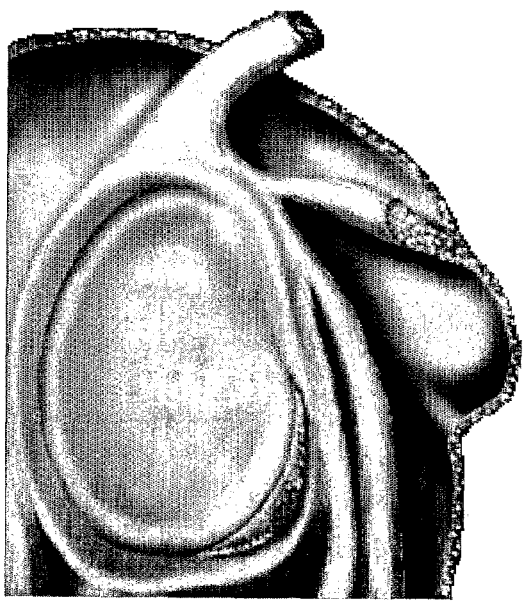
FIG. 1A is a textbook[31] illustration of a shoulder socket.
Figure 1B:
FIG. 1B is an image of a shoulder socket generated using volumetric depth peeling according to an embodiment of the subject matter described herein.

As stated above, the subject matter described herein includes methods, systems, and computer program products for processing three-dimensional image data to render an image from a viewpoint within or beyond an occluding region of the image. For example, it may be desirable to render a cartilage surface of a shoulder socket from the viewpoint within the shoulder head. FIGS. 1A and 1B respectively illustrate a shoulder socket cutaway from a textbook[31] and a shoulder socket image generated using a technique described herein, referred to as volumetric depth peeling. It can be seen that the image in FIG. 1B includes detail of the inner surface of the shoulder joint that is not shown in the image drawing in FIG. 1A.

Volumetric depth peeling (VDP) is an extension to volume rendering that enables display of otherwise occluded features in volume data sets. VDP decouples occlusion calculation from the volume rendering transfer function, enabling independent optimization of settings for rendering and occlusion. The algorithm is flexible enough to handle multiple regions occluding the object of interest, as well as object self-occlusion, and requires no pre-segmentation of the data set. VDP was developed as an improvement for virtual arthroscopy for the diagnosis of shoulder-joint trauma and has been generalized for use in other simple and complex joints and to enable non-invasive urology studies. In virtual arthroscopy, the surfaces in the joints often occlude each other, allowing limited viewpoints from which to evaluate these surfaces. In urology studies, the physician would like to position the virtual camera outside the kidney collecting system and see inside it. By rendering invisible all voxels between the observer's point of view and objects of interest, VDP enables viewing from unconstrained positions. In essence, VDP can be viewed as a technique for automatically defining an optimal data- and task-dependent clipping surface. Radiologists using VDP display have been able to perform evaluations of pathologies more easily and more rapidly than with clinical arthroscopy, standard volume rendering, or standard MRI/CT slice viewing.

Arthroscopy and Urography

Clinical Arthroscopy

Figure 2:
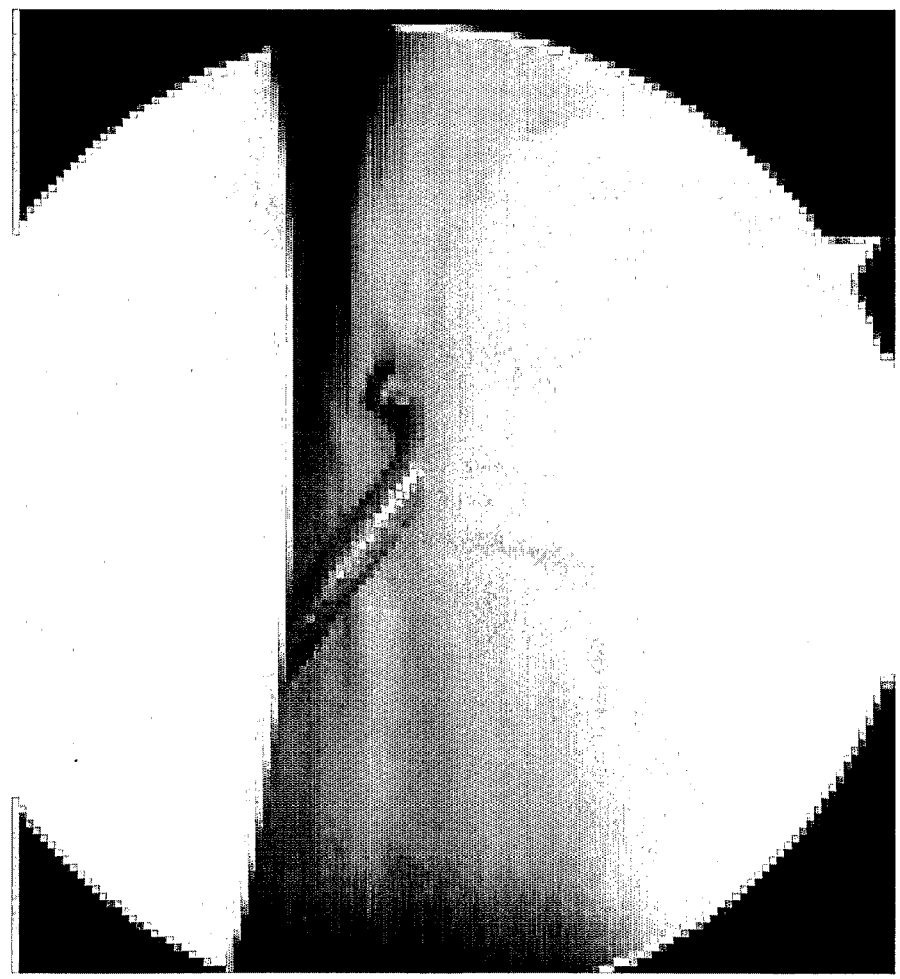
FIG. 2 is an image showing the interior of a joint viewed through an arthroscopic camera.

Arthroscopy is the process of inserting an arthroscope (a small camera) into a joint through an incision in the skin, enabling viewing of the interior of the joint. FIG. 2 illustrates an image of a shoulder joint generated using an arthroscopic camera. As can be seen from FIG. 2, the view from the camera is constrained by the viewing angle of the camera.

Arthroscopy is useful for diagnosis of derangements within the joint and for performing surgery to treat such derangements. Arthroscopy is an expensive, invasive procedure that requires skilful manipulation of arthroscopic tools confined within the cramped spaces within joints. For pre- and post-operative diagnosis of joint derangements, it is less invasive to view MRI images of the joint.

MRI Slice Viewing

MRI images showing tissue densities provide an alternate method to display joint surfaces. By viewing slices of MRI data along the three orthogonal axes, clinicians can diagnose joint pathologies without the use of invasive arthroscopic procedures. FIG. 3 illustrates an example of MRI images of a shoulder joint taken along three orthogonal axes. Often, a contrast agent is injected into the joint to aid in diagnosis. Although joint pathologies can be determined from these images, diagnosis requires tedious manual selection of slices and a difficult mental reconstruction of 3D structures from slices along one axis, correlated with features along the other two axes. Virtual arthroscopy (VA) enables real-time evaluation of joint surfaces in 3D, removing this tedious slice manipulation and difficult 3D mental reconstruction.

Virtual Arthroscopy

VA is the 3D rendering of joint surfaces from MRI or CT data sets for diagnosis of joint pathologies. Commercial systems such as the Siemens Syngo software running on the Leonardo workstation use standard volume rendering to enable VA flythroughs. A flythrough refers to a user guided video tour through three dimensional image data assembled from MR or CT slices. With this flythrough system, the user can position the virtual camera in the joint space and move to obtain views similar to those obtained in clinical arthroscopy. The top and bottom left images in FIG. 4 are MRI images of a shoulder joint. In these images, the intersecting lines illustrate the position of a virtual camera used to generate the flythrough images. The bottom right image in FIG. 4 is a still shot of a flythrough image of the shoulder joint. Although it is noninvasive and requires no surgery, this approach shares the limitation of real arthroscopy: the virtual camera is confined within the joint space. For example, in the bottom right image, it can be seen that when performing a flythrough view is limited to areas between the humeral head and the glenoid. To render the surfaces, the transfer function of the volume rendering is set to render voxels within the range of values of the surfaces in the joint. Placing the camera outside of the joint space results in the surfaces occluding each other.

Figure 5:
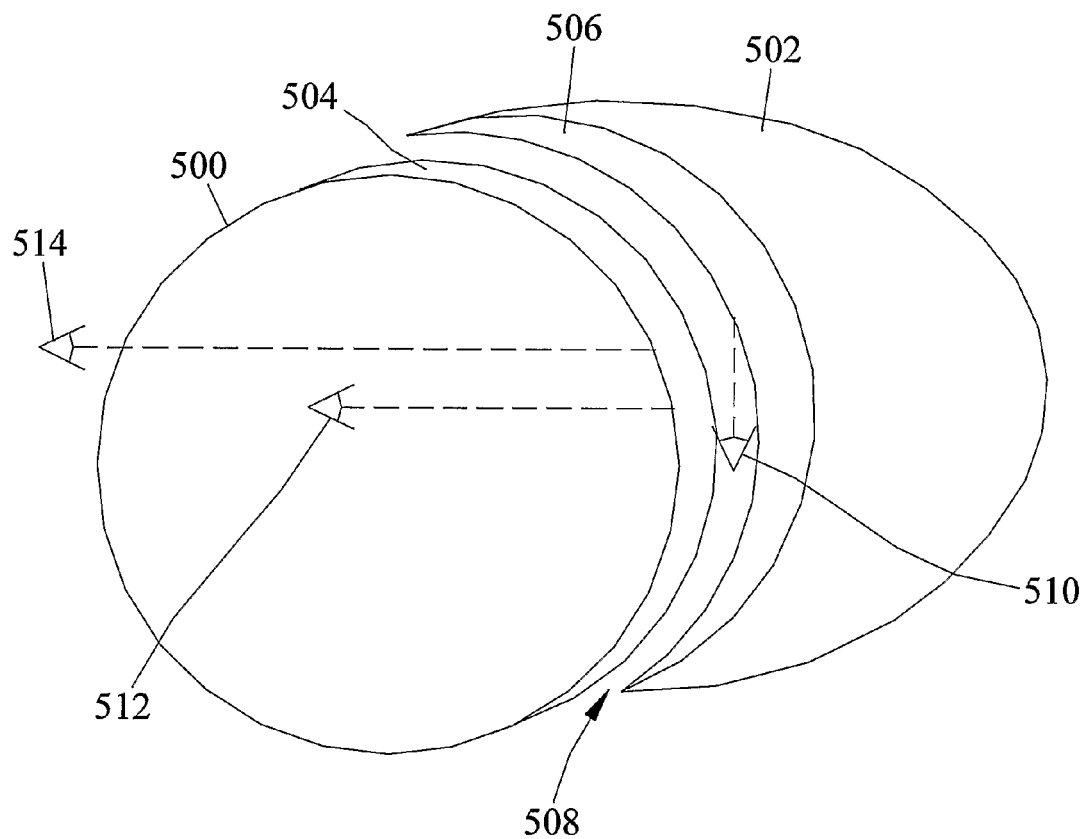
FIG. 5 is a schematic of a shoulder joint illustrating a desired viewpoint within an occluding region.

FIG. 5 is a schematic diagram of a shoulder joint. In FIG. 5, regions 500 and 502 respectively represent the bones of the shoulder joint. Regions 504 and 506 represent the cartilage layers of the shoulder joint. Region 508 represents the space between cartilage layers 504 and 506. In prior art systems, viewing of the surface represented by cartilage 506 was limited to points within region 508 as represented by constrained viewpoint 510. The subject matter described herein allows images of surfaces or regions to be rendered from viewpoints within or beyond occluding objects. For example, desired viewpoint 512 is within the occluding region defined by bone 500. The present subject matter allows rendering of surfaces, such as surface 508, from viewpoints within occluding regions, such as viewpoint 512 within bone 500. In addition, a viewpoint, such as viewpoint 514, can be defined beyond bone 500, and cartilage surface 506 can still be accurately rendered.

Because of the viewpoint limitations of conventional virtual arthroscopy, the clinician must evaluate the joint surfaces from viewpoints at extreme angles or very close to the surface, much like evaluating the surface of the hand with the palm touching the tip of the nose. This restriction necessitates tedious maneuvering of the virtual camera to find the best available positions from which to evaluate the surface and requires a mental reconstruction of the surface from these limited vantage points. Standard VA thus adds the burden of navigating the joint to the task of evaluating the images for pathology. VDP was developed at the request of radiologists to enable unconstrained placement of the virtual camera for unobstructed views of entire areas of interest by automatically culling occluding voxels between the viewpoint and the far side of the joint space. VDP provides views resembling textbook cutaways, enabling rapid surveying of the joint for pathology (see FIG. 1B).

Endoscopic Ureteroscopy

In endoscopic ureteroscopy, an endoscope (a small camera, similar to that used in arthroscopy) is used to examine the kidney collecting system for tumors and stones. This procedure is costly and can be very uncomfortable for the patient. It is also difficult to maneuver the endoscope into the multiple renal calyces (portions of the kidney urine passes through). Due to these drawbacks, physicians routinely view CT images of the urinary system in a technique called CT urography.

CT Urography

In CT urography,[2, 10, 25, 26] a contrast agent that appears very bright in CT images is injected into the urinary system of the patient and concentrated by the kidney which excretes it into the renal collecting system. The contrast between the agent and the tissue of the collecting system enables the physician to view CT slices to diagnose tumors, much like the technique of MRI slice viewing for diagnosing joint defects. CT slice viewing therefore suffers from similar drawbacks: tedious manual selection of slices and correlation with features in other slices to mentally reconstruct 3D features. Coronal maximum intensity projection images are also used; however, in this case, the physician is restricted to viewing from this projection. Collaborating physicians feel that multiple projections and opacity control are critical to enable virtual urography (VU) for improving upon CT urography.

Virtual Urography

To perform VU, the physician would like to be able to obtain views of the interior of the urinary system (the renal pelvis, ureter, and bladder) from both inside and outside these structures. By using VDP, the physician can obtain views of the interior from outside these structures that are not possible using standard volume rendering.

Figure 6A:
FIGS. 6A and 6B respectively illustrate standard volume rendering and VDP rendering of a renal pelvis.
Figure 6B:
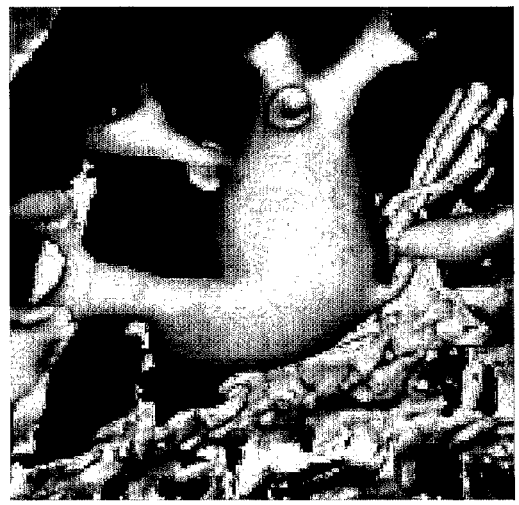

For example, FIG. 6A illustrates an image of a renal pelvis generated using standard volume rendering of the exterior. FIG. 6B illustrates rendering of the interior of the renal pelvis using volumetric depth peeling according to an embodiment of the subject matter described herein. In FIG. 6B, the surface of the renal pelvis closest to the viewpoint is rendered in transparent manner. As a result, abnormalities inside the renal pelvis could be visible in FIG. 6B.

Volumetric Depth Peeling

Description of Algorithm

Figure 7:
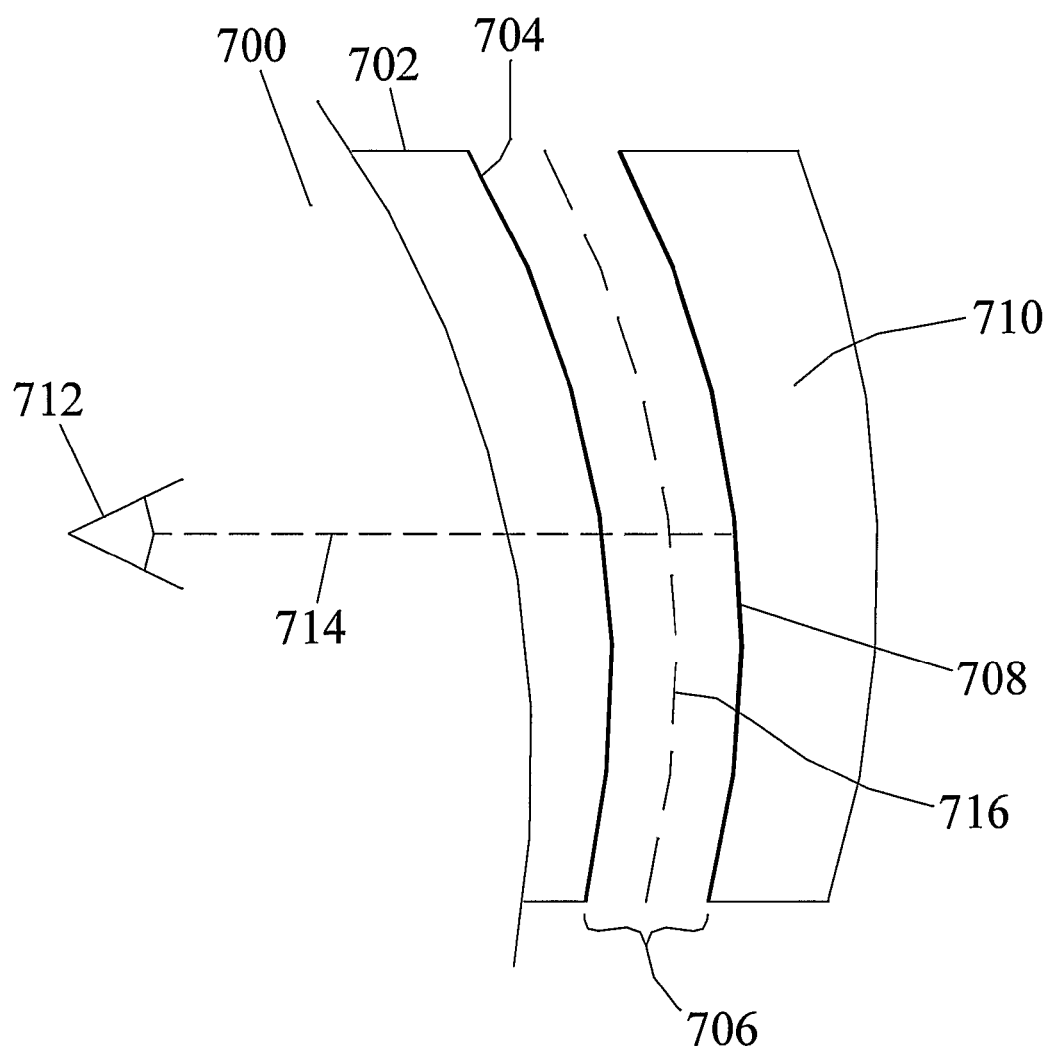
FIG. 7 is a schematic diagram illustrating volumetric depth peeling to render the second cartilage surface of a shoulder joint according to an embodiment of the subject matter described herein.

VDP is an extension to the standard volume rendering algorithm that gives users the ability to see through occluding material to the area of interest. In MRI images of joints, the contrast agent defining the joint space is brighter than the cartilage surface of interest and the clinician usually wishes to see the second surface through the first. FIG. 7 illustrates an image of two cartilage surfaces where it is desirable to render the second cartilage surface from a viewpoint within a bone. In particular, in FIG. 7, region 700 defines an area within a bone. Region 702 defines a first cartilage region from the desired viewpoint. Region 704 defines the first interface between the cartilage and a contrast region 706. Region 708 represents the second interface or second surface between contrast region 706 and a cartilage region 710.

In the illustrated example, it is desirable to render region 708 from viewpoint 712, which is within the bone region. In order to perform such rendering, a plurality of rays is cast from viewpoint 712 to surface 708 and voxel intensity is measured at each point along each ray. Since cartilage will have a different pixel intensity value than bone or contrast region, it may be desirable to design a transfer function that renders all bone and contrast voxels as transparent and that renders are cartilage voxels as visible. However, in the example illustrated in FIG. 7, there are two cartilage surfaces along each ray, such as ray 714, from viewpoint 712 to surface 708. As a result, rendering all cartilage as visible would cause cartilage region 702 to occlude cartilage region 710.

In order to avoid this difficulty, an occlusion determination can be made such that all voxels are rendered as transparent or partially transparent until the contrast region is reached. Once the contrast region is reached, standard volume rendering using a transfer function that accumulates voxel color and intensity along rays cast from the desired viewpoint can be performed to render the contrast region and the second cartilage surface. This case is an implementation of volumetric depth peeling referred to above as second surface rendering.

In FIG. 7, dashed line 716 represents the point where the voxel intensity along ray 714 reaches the threshold value to indicate that contrast has been detected. The portion of ray 714 to the left of threshold 716 is discarded. The portion of ray 714 to the right of threshold 716 represents the restarted ray or transfer function where voxel color and intensity accumulation continues.

The following pseudo code illustrates an example of the second surface rendering method illustrated in FIG. 7:

```
reached_threshold = false;
while (traversing_ray) {
    if (!reached_threshold) {
        if (current_value >= threshold) {
            accumulated_opacity = 0;
            accumulated_color = 0;
            reached_threshold = true;
        }
    }
    do_normal_volume_rendering( );
}
```

In the pseudo code above, a variable called reached_threshold is initially set to false. While traversing each ray, the current voxel intensity value is compared to a threshold value, which is set to be the lowest value known to correspond to contrast. If the contrast is reached, the opacity and color for all voxels prior to the contrast are set to 0 to make them transparent. The reached_threshold variable is set to true, which causes the threshold check to no longer be executed within the while loop. Volume rendering is then performed to record the voxel intensity values along the ray after the contrast has been detected.

Figure 8A:
FIG. 8A is an image illustrating a constrained view of an elbow joint.
Figure 8B:
FIG. 8B is an image of an elbow joint generated using volumetric depth peeling according to an embodiment of the subject matter described herein.

The result of applying this algorithm to an MRI of an elbow joint can be seen in FIGS. 8A and 8B. More particularly, FIG. 8A illustrates a constrained view of an elbow generated from a viewpoint outside of an occluding region, and FIG. 8B illustrates a viewpoint of an elbow generated using volumetric depth peeling from a point within an occluding region.

Figure 9A:
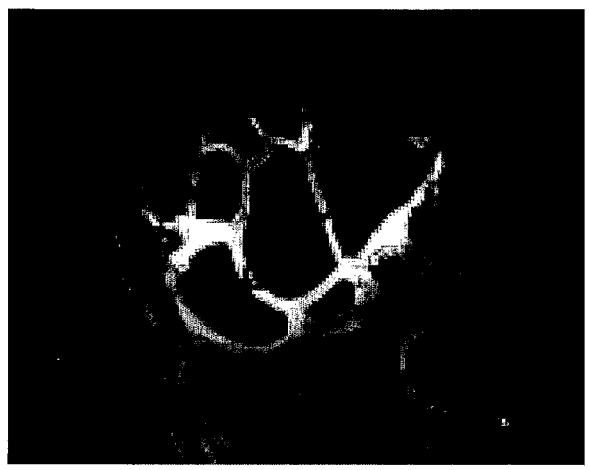
FIG. 9A is an image of the bones of a human wrist.

VDP can also render features of interest in joints such as wrists which have multiple occluding layers by choosing to render the third, fourth, etc. surface, or by rendering the last surface encountered, rather than the second. More particularly, FIG. 9A illustrates an MRI image of a wrist. The arrow in FIG. 9A terminates on the surface of a bone that is desired to be displayed. The tail of the arrow represents the desired viewpoint. From FIG. 9A, it can be seen that the surface desired to be displayed is occluded by other surfaces (bones) of the same material.

Figure 9B:
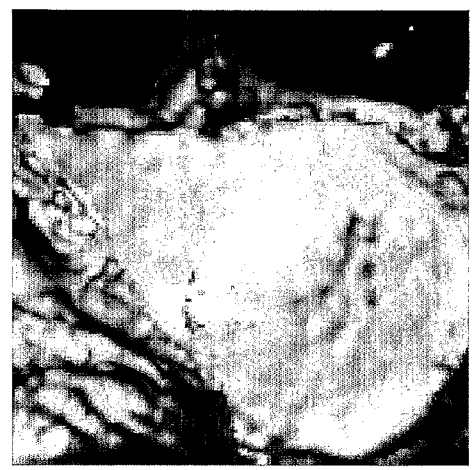
FIG. 9B is an image of an image of the bones of a human wrist generated using volumetric depth peeling according to an embodiment of the subject matter described herein.

VDP can be used to render the $n^{th}$ surface when multiple surfaces of the same or similar material as the surface of interest occlude the surface of interest. FIG. 9B illustrates an image of a bone in the wrist seen through multiple occluding layers generated using volumetric depth peeling.

Figure 10A:
FIG. 10A is an image of an aneurysm generated using standard volume rendering.
Figure 10B:
FIG. 10B is an image of an aneurysm generated using volumetric depth peeling according to an embodiment of the subject matter described herein.

VDP is a simple addition to the volume rendering algorithm that enables rendering invisible all material between the observer's viewpoint and the feature that the observer wishes to see. VDP was initially developed for surface rendering of datasets. However, full transfer function flexibility and control is available. VDP has been used to render images of an aneurysm, complete with transfer function control of volumetric transparency, and is compatible with all transfer function effects, such as nonphotorealistic rendering techniques. FIG. 10A illustrates an image of an aneurysm generated using standard volume rendering with transparency. FIG. 10B illustrates an image of the aneurysm generated using volumetric depth peeling with transparency.

Figure 11A:
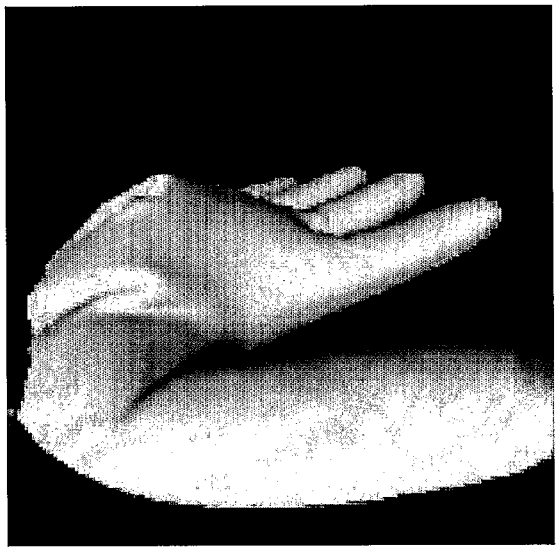
FIG. 11A is an image of a rubber glove generated using standard volume rendering.
Figure 11B:
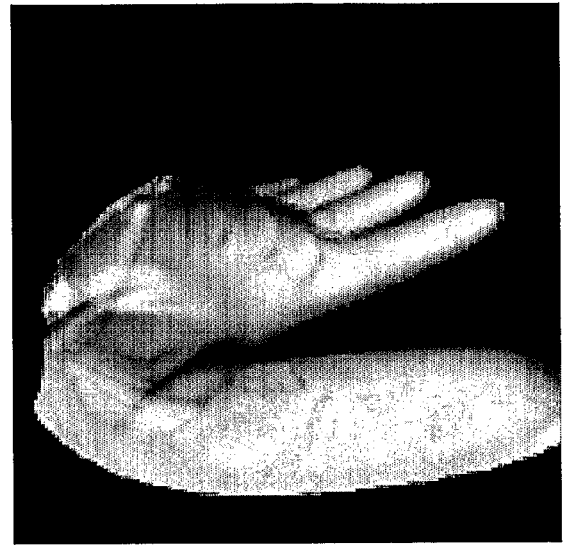
FIG. 11B is an image of the rubber glove generated using volumetric depth peeling according to an embodiment of the subject matter described herein.

Using VDP with VA and VU, all of the accumulated color and opacity between the viewpoint and the surface of interest can be discarded. However, this approach can be modified. By keeping some of the accumulated color and opacity, interesting transparency effects can be created. FIG. 11A illustrates an image of the outside of a rubber glove generated using standard volume surface rendering. FIG. 11B illustrates an image of the surface of a glove generated using volumetric depth peeling where the surface of the glove is shown with partial opacity so that the interior of the glove can be shown. In the illustrated example, a mass inside the thumb region of the glove can be seen using VDP, whereas the mass was not visible using standard volume surface rendering.

It should be noted that the near and far surfaces are the same type of material from the same object, but are treated differently based on whether they are the near or far surface, enabling different transfer functions to be used for each. Using VDP, rays which do not get culled can be handled in any number of ways. For example, they can be discarded to remove distraction or rendered with a transfer function to provide context. For example, FIGS. 12A-12C illustrate images of an engine including interior parts. More particularly, FIG. 12A illustrates an image of the exterior surface of an engine generated using standard volume rendering. FIG. 12B illustrates an image of interior parts of the engine where exterior parts of the image are shown in partial transparency. FIG. 12C illustrates an image of the interior parts of the engine where the exterior parts of the image are shown as totally transparent to remove distraction.

Figure 13A:
FIG. 13A is a restricted view of an elbow fracture.
Figure 13B:
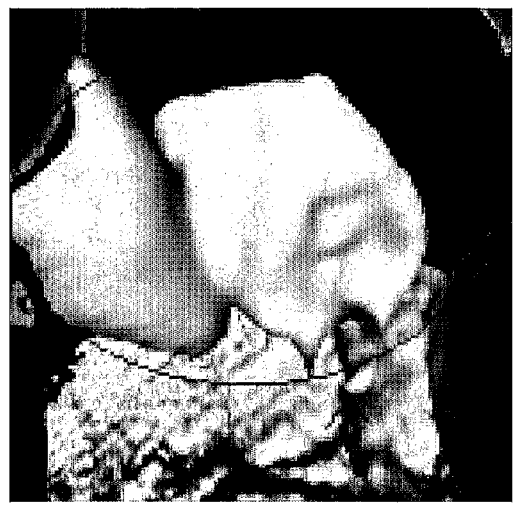
FIG. 13B is an image an elbow fracture generated using volumetric depth peeling according to an embodiment of the subject matter described herein.

VDP of CT scans of bone fractures, where there is no contrast dye and the intensity of the volume between the bones is lower than that of the bones, has also been successful. More particularly, FIG. 13A illustrates an image of an elbow fracture from a constrained view generated using standard volume rendering, and FIG. 13B illustrates a view of a fracture from inside the bone from which the fracture broke. The image in FIG. 13B was generated using volumetric depth peeling according to an embodiment of the subject matter described herein. VDP was developed for medical imaging, but is directly applicable for viewing non-medical data, such as the engine block seen in FIGS. 12A-12C.

In summary, the VDP algorithm exhibits the following attributes:
Simple addition to current volume rendering systems
Requires no pre-segmentation
Handles single, multiple, and self-occlusion
Can discard or modulate accumulated color and opacity
Can discard or display non-culled rays
Independent of transfer function definition, enabling full range of transfer function effects
Developed for medical applications, but generalizes to other volume data sets
Comparison with Alternative Methods The examples below concentrate on VA and VU, using the simple threshold based method to render the second surface with no transparency effects. Note that in these cases, determining the appropriate threshold is accomplished by setting the appropriate transfer function, as the threshold will be epsilon higher than the highest value included in the transfer function of the material of interest. The following paragraphs discuss translucent surface, clipping planes, presegmentation, isosurface generation, and view extracted joint space, which are alternatives to VDP.

Translucent Surfaces

One approach to display far surfaces through the near surface would be to set the transfer function to render each surface partially transparent. However, several studies[15] have shown that untextured translucency is a poor method for conveying shape, as the human visual system is not adept at interpreting the shape of such surfaces. For example, in the aneurysm image of FIG. 10A where the surface of the aneurysm is shown to be partially transparent, the shape of the aneurysm is difficult to determine. Even improved textured techniques[15, 28] are not suitable for VA because the near surface is of no interest, and even screen-door transparency occludes portions of the far surface and renders portions of the far surface transparent, possibly hiding pathology.

Clipping Plane

Figure 14:
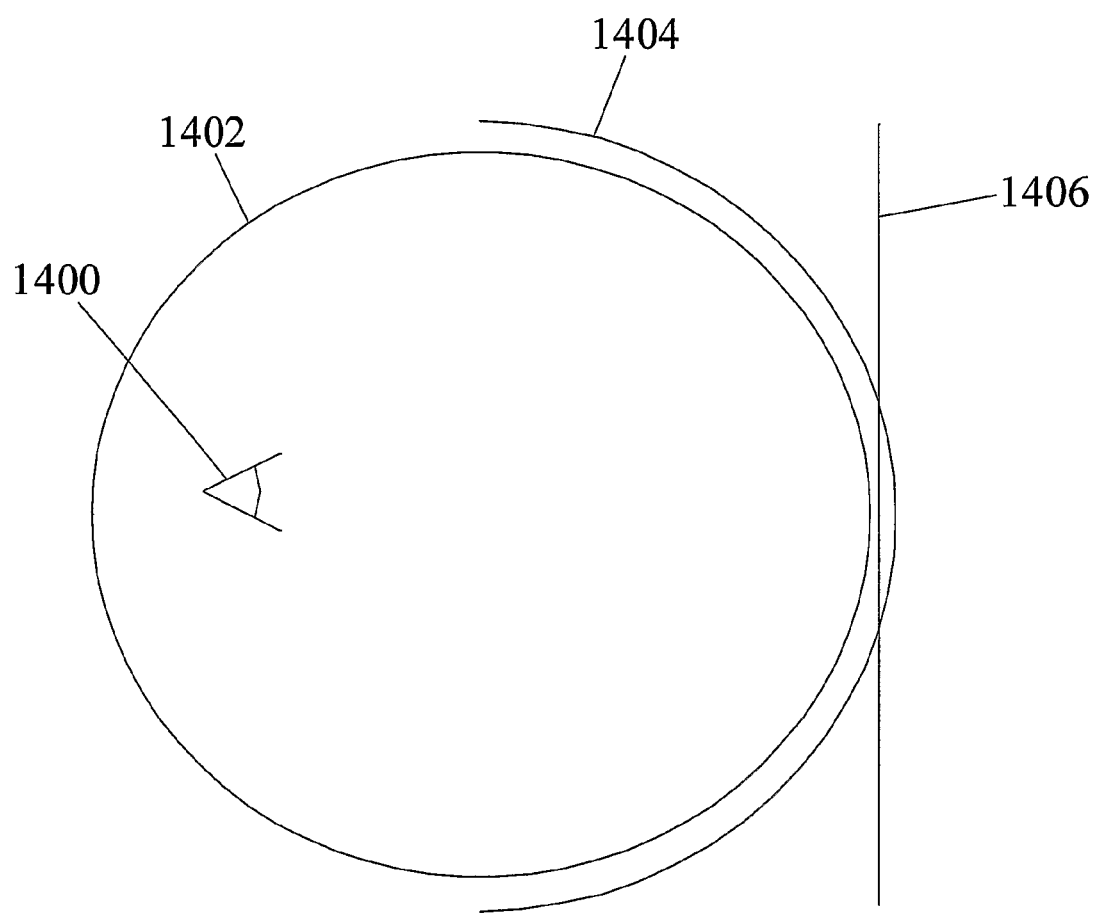
FIG. 14 is a diagram illustrating conventional rendering using a clipping plane.

An earlier attempt at viewing the surface of interest through occluding surfaces was to use a clipping plane to cull the occluding surfaces. This technique had two limitations. The first was that the position of a user-defined clipping plane must be constantly updated by the user when moving to new viewpoints. Although this drawback can be alleviated by placing a fixed clipping plane in the space between the two surfaces, for structures like ball-and-socket joints no single clipping plane is sufficient to render the entire far surface. FIG. 14 illustrates the use of a clipping plane. In FIG. 14, a viewpoint 1400 is defined within a bone 1402. The surface that is desired to be rendered is surface 1404. A clipping plane 1406 is placed between bone 1400 and surface 1404 such that all points to the left of clipping plane 1406 will be erased and all points to the right of clipping plane 1406 will be shown as visible in the final image. A problem with this approach is that it only shows a small portion of surface 1404. In contrast, as described above, using a transfer function and volumetric depth peeling, the entire surface 1404 can be rendered. In the case of complex joint surfaces, defining a more complicated clipping geometry is equivalent to performing a manual segmentation of the joint space, a very tedious process that must be performed for each data set. In essence, VDP can be viewed as a technique for automatically defining an optimal data-dependent clipping surface.

Pre-Segmentation

Figure 15:
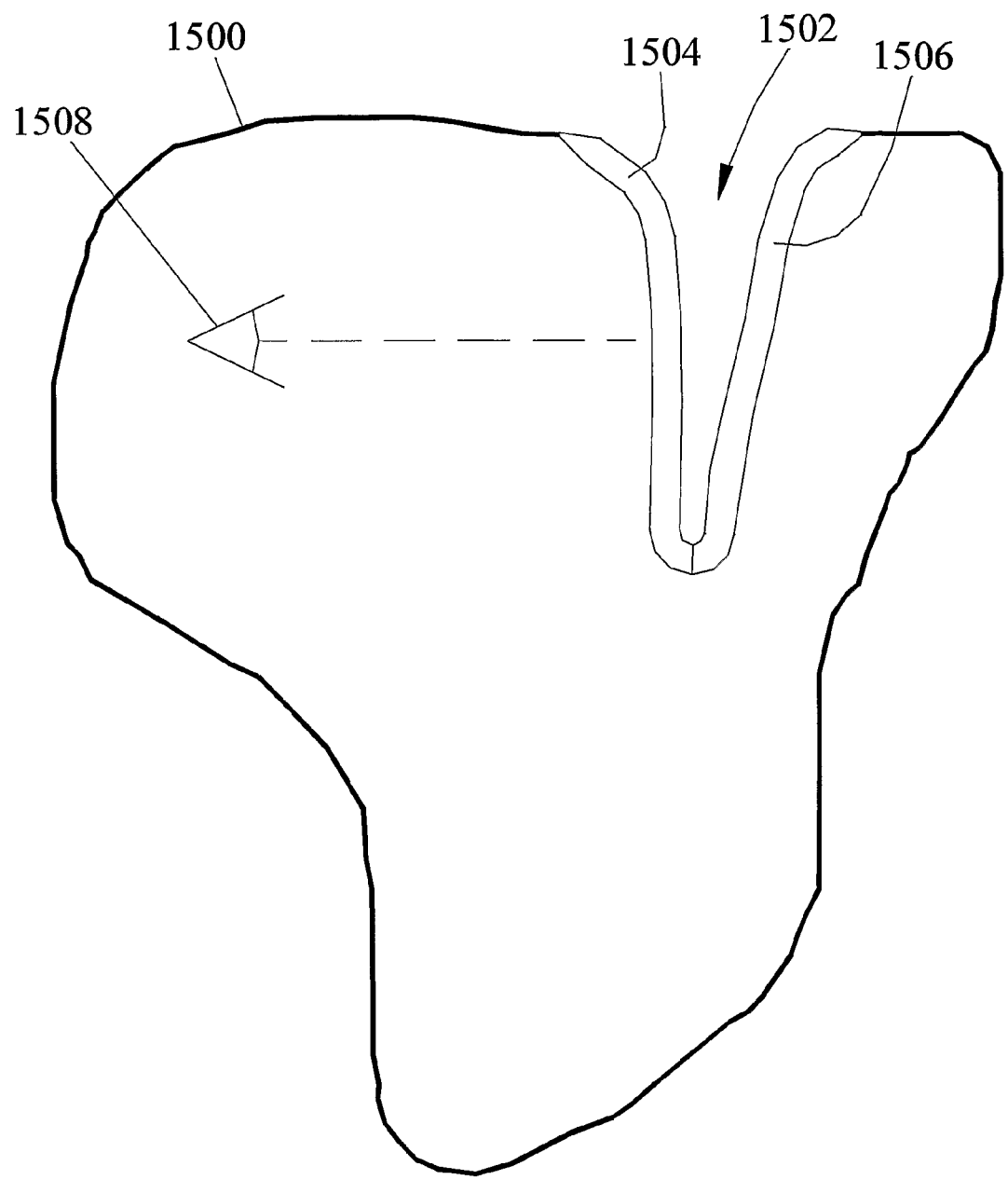
FIG. 15 is a diagram of a self-occluding surface that may be rendered using volumetric depth peeling according to an embodiment of the subject matter described herein.

Another possible technique for viewing the surface of interest is performing a manual or automatic pre-segmentation of the surfaces, and manually selecting which surface to display. In many cases, this approach is valid, although segmentation techniques are often slow, with various parameters to fine tune. VDP is designed for rapid ease of use by physicians and requires no explicit segmentation. In addition, there are various configurations in which straightforward rendering of segmented data will not work. For any non-convex surface, there are views from which even a segmented surface will occlude itself. FIG. 15 illustrates an example of a self-occluding surface that is not easily rendered using manual segmentation. In FIG. 15, surface 1500 may be a bone. Concave region 1502 is defined by surfaces 1504 and 1506. If it is desirable to render surface 1506 from viewpoint 1508, surface 1506 will be occluded by surface 1504. Using manual segmentation, because all of surface 1500 is identified as bone, there is no way to show the occluded surface. However, using volumetric depth peeling, as described herein, a transfer function may reset after passing through surface 1504 to show surface 1506. As a result, the subject matter described herein enables accurate viewing of objects that includes self-occluding surfaces. Such irregular surfaces occur in locations such as bone fractures and folded surfaces (FIG. 13). Similarly, no segmentation is able to render the interior surfaces of objects from outside the object, although isosurface generation and depth peeling techniques can work in some situations.

Figure 16:
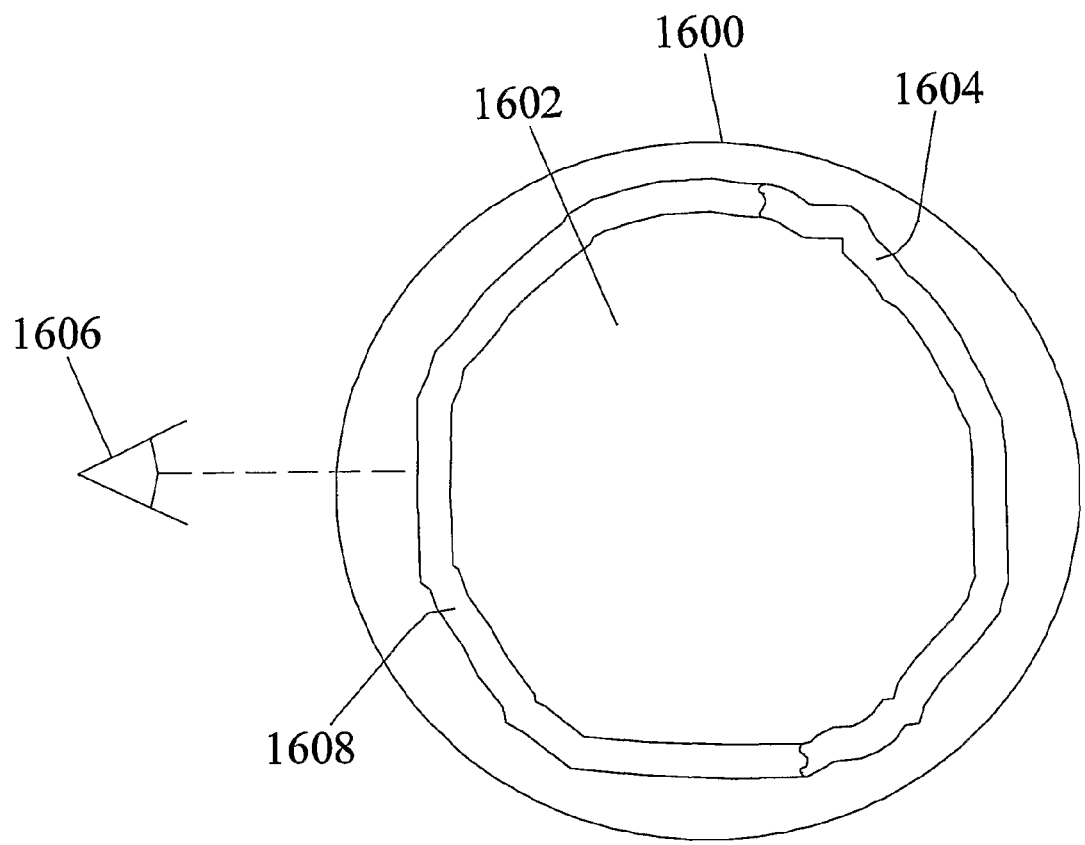
FIG. 16 is a diagram illustrating interior surface occlusion.

FIG. 16 illustrates an example of internal surface occlusion. In FIG. 16, area 1600 may represent a bone with a hollow interior region 1602. As such, when trying to view surface 1604 from a viewpoint 1606 outside of bone 1600, surface 1608 will occlude such viewing. Segmentation is not able to distinguish between surfaces 1604 and 1608 because they both constitute bone. However, volumetric depth peeling as described herein can reset the transfer function after reaching surface 1608 to accurately display surface 1604. These views of interior surfaces were the views sought by physician colleagues for performing VU. VDP handles these configurations with no special cases (FIG. 6).

Isosurface Generation

Figure 17:
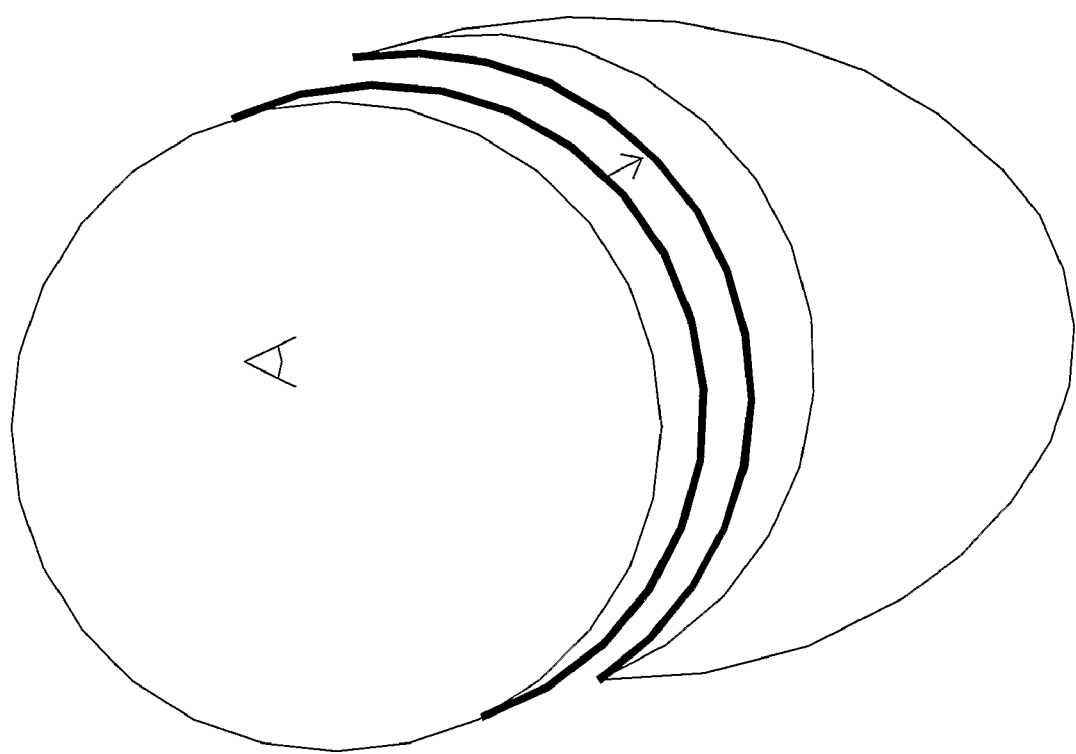
FIG. 17 is a diagram illustrating conventional rendering using back face culling.
Figure 18:
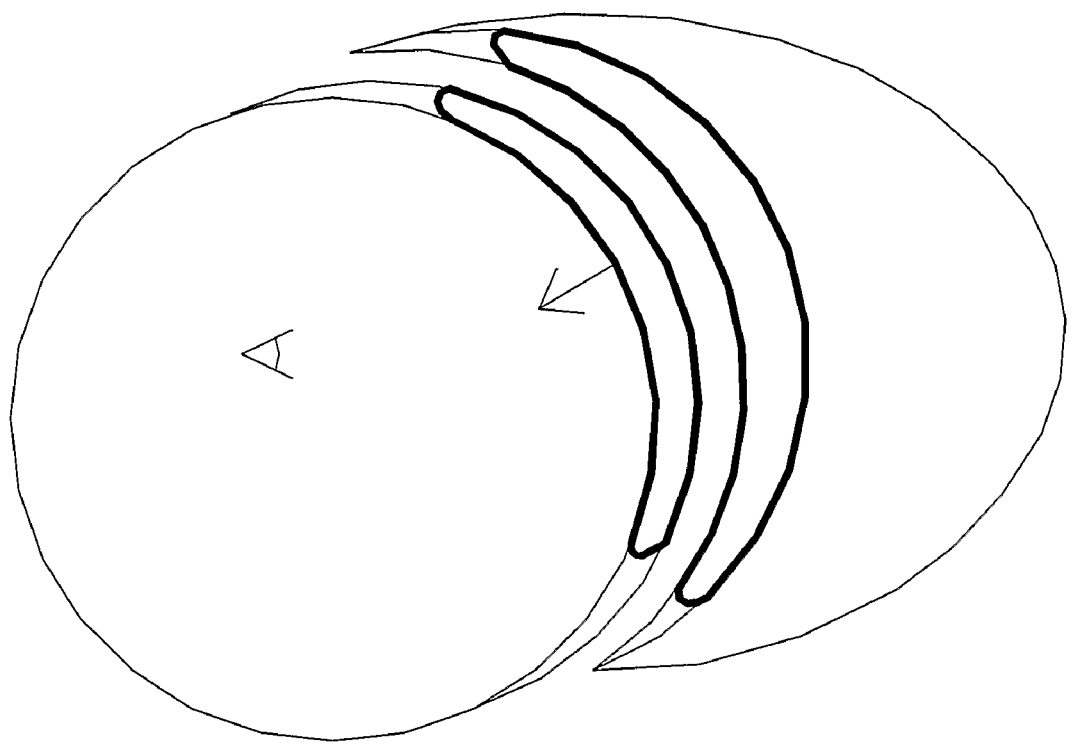
FIG. 18 is a diagram illustrating surfaces for which back face culling does not work.

Another possible technique for viewing the surface of interest through occluding surfaces is defining an isosurface at the correct isovalue to represent the surface of interest and rendering the resulting geometry with back-face culling turned on. This technique works under certain conditions, but there are common configurations in which it is insufficient. FIG. 17 shows a configuration where back-face culling enables viewing the far surface because all the normals of the occluding surface face away from the viewpoint. However, in FIG. 18, the configuration that generally arises can be seen. In this case, simple back-face culling does not remove the entire near surface, as there are front-facing polygons of the occluding surface between the viewpoint and the surface of interest. Depth peeling techniques can remedy this problem. However, this technique will require the user to enable and disable depth peeling when maneuvering into and out of the joint space, whereas VDP enables seamless maneuvering without any further user interaction.

Additionally, generating a good isosurface of cartilage surfaces in MRI images is problematic due to inhomogeneities in the data, VDP enables more sophisticated transfer function design and the full range of transfer function effects. Generating and rendering isosurfaces with depth peeling can be viewed as an approximation to a subset of the full functionality of VDP that might be useful in certain situations.

View Extracted Joint Space

Another possible technique for viewing the surface of interest through occluding surfaces is to extract the joint space (the area filled with contrast agent) either with an isosurface, or with another segmentation method, and view the resulting geometry with front-face culling turned on. Defining an isosurface of the joint space has the same problems as described above in the section entitled Isosurface Generation, and even an accurate segmentation of the joint space will have the same problems as described in the section above entitled Pre-segmentation. However, a pre-segmented joint space could be used to determine occlusion within the VDP algorithm.

Results

Figure 19:
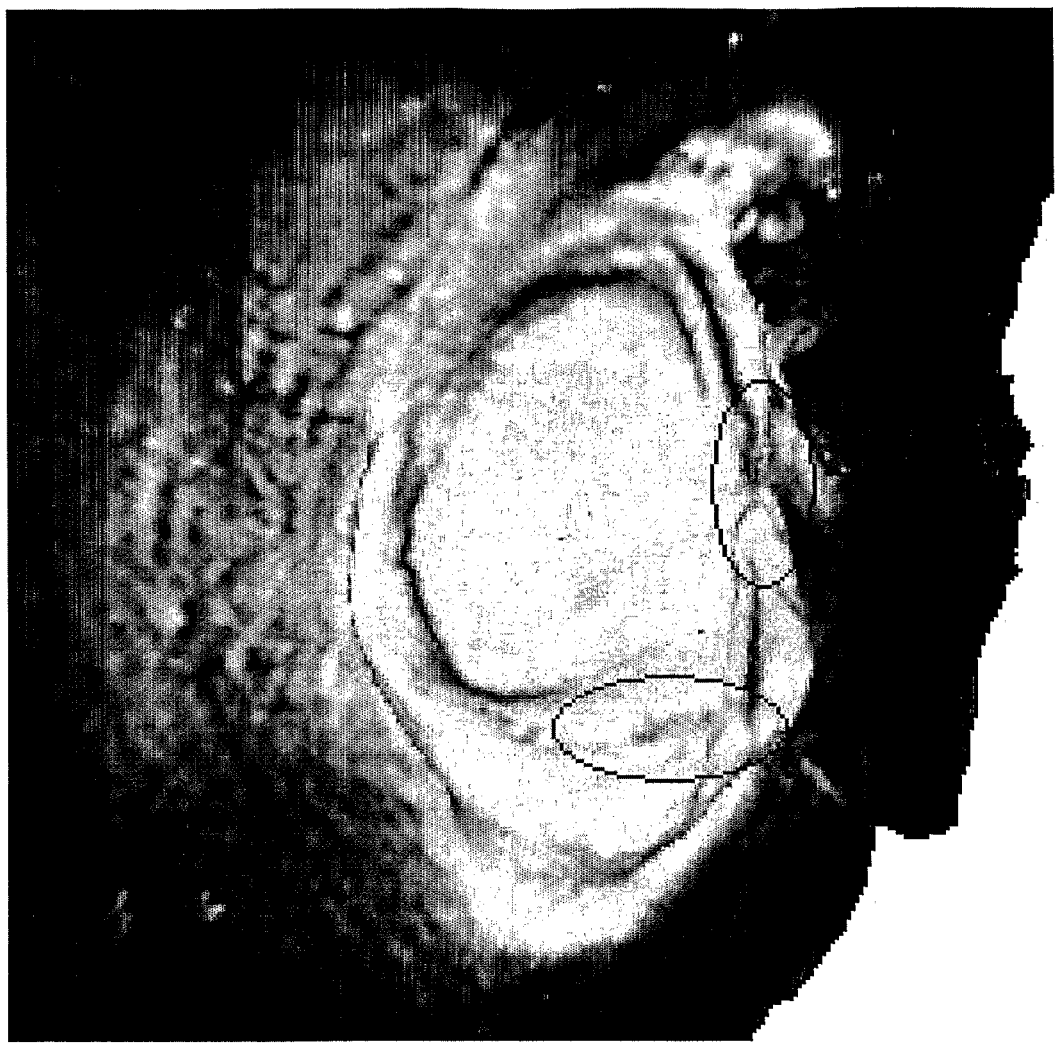
FIG. 19 is a an image displaying a torn ligament and Bankart lesion of a glenoid where the image is generated using volumetric depth peeling according to an embodiment of the subject matter described herein.

The VDP algorithm has been incorporated into an application for viewing MRI and CT data built on top of the Visualization Toolkit (VTK) and wxWidgets. A validation study using phantoms and 20 kidneys of using VDP for VU has been completed. A full local Investigational Review Board approved evaluation study is also currently underway for VA of shoulder joints. Viewing several shoulder data sets with this application has enabled collaborators to instantly recognize pathologies within the joint, even prompting one surgeon to state that he would change how he approached the surgery based on VDP-generated images versus viewing MRI slices due to his greater appreciation of the size and shape of a particular lesion. Some preliminary results are discussed here. The shoulder is a ball and socket joint consisting of the humeral head (the ball), and the glenoid (the socket). The glenoid is a relatively shallow socket, so various ligaments and tendons are necessary to keep the humeral head in place. These ligaments and tendons are apt to be injured. In FIG. 19, an overview of the glenoid is shown. This view is created by placing the virtual camera inside the humeral head, using VDP to remove the occluding volume of the humeral head. A view such as this is useful to the physician for performing an initial survey of the glenoid to check for pathology, and is not possible using standard volume rendering. In this case, the physician was able to immediately diagnose the torn middle glenohumeral ligament, circled on the right-hand side of the image, and the Bankart lesion, circled on the bottom of the image.

Figure 20A:
FIGS. 20A and 20B respectively illustrate ligament tear views generated using standard volume rendering and volumetric depth peeling according to an embodiment of the subject matter described herein.
Figure 20B:
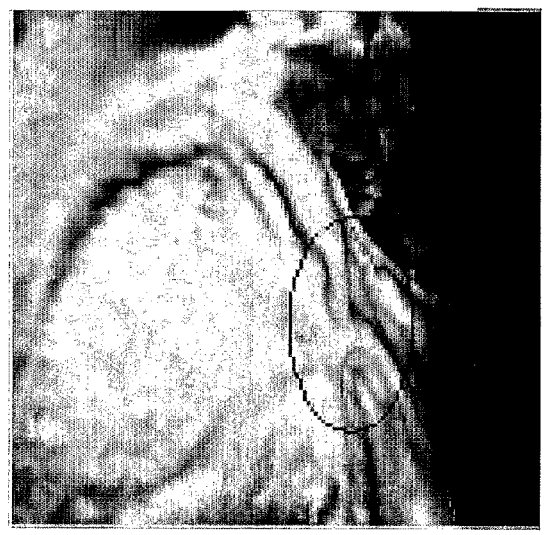
Figure 21A:
FIGS. 21A and 21B respectfully illustrate Bankart lesion views generated using standard volume rendering according to an embodiment of the subject matter described herein.
Figure 21B:
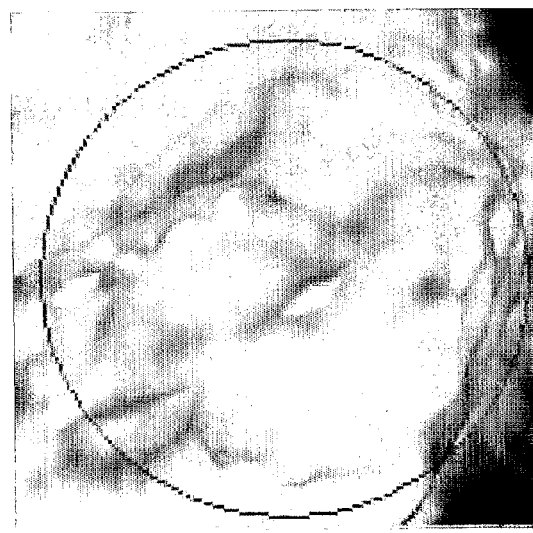
Figure 21C:
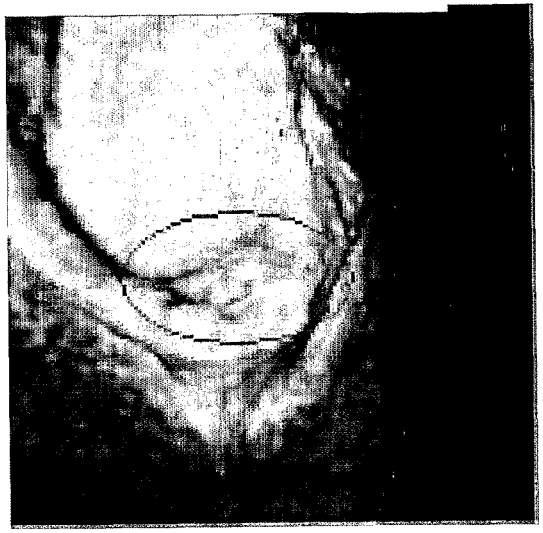
FIGS. 21C and 21D respectfully illustrate Bankart lesion views generated using volumetric depth peeling according to an embodiment of the subject matter described herein.
Figure 21D:
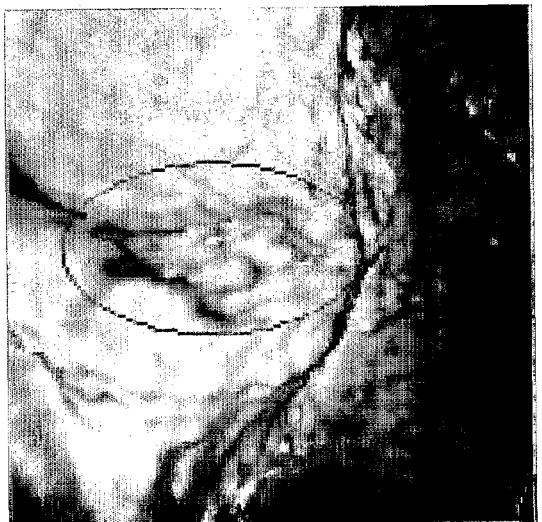

FIGS. 20A and 20B show closer views of the torn ligament. The view in FIG. 20A was created using standard volume rendering from within the joint space. The curved surface to the left of the image in FIG. 20A is the humeral head, which is nearly touching the glenoid. The torn ligament is circled in the image. Because the virtual camera is constrained to the joint space, the tear must be viewed at an angle and very close to the tear, making it difficult to find and diagnose. FIG. 20B illustrates a view of the torn ligament generated using VDP. Once again the tear is circled, and in this view it is much easier to see the tear and place it in context with neighboring anatomical structures.

FIG. 21 shows closer views of the Bankart lesion, with the lesion circled. FIGS. 21A and 21B are views created using standard volume rendering. As with the view of the ligament, the camera is forced to be either at an extreme angle, or extremely close to the lesion. FIGS. 21C and 21D are views created with VDP, enabling unconstrained placement of the virtual camera to get better views of the lesion.

Figure 22:
FIG. 22 is an image of a humeral head generated using standard volume rendering according to an embodiment of the subject matter described herein.
Figure 23A:
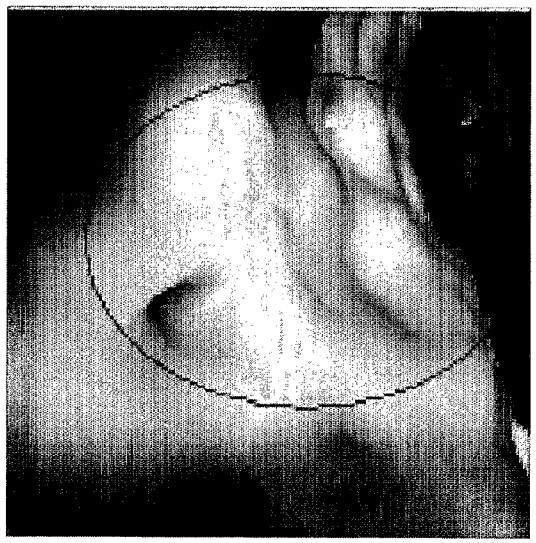
FIG. 23A is an image of a Hill Sachs lesion generated using standard volume rendering.
Figure 23B:
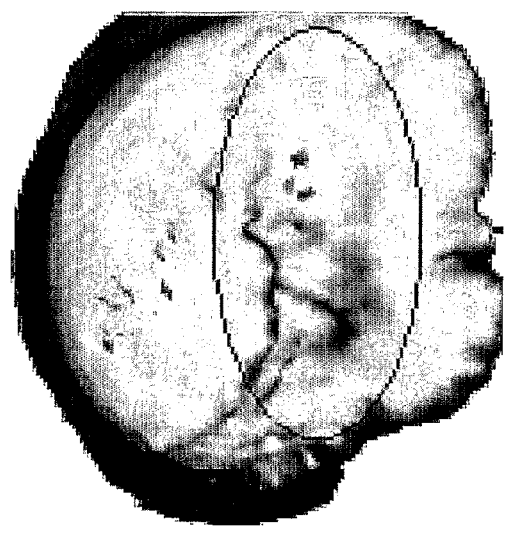
FIG. 23B is an image of the Hill Sachs lesion generated using volumetric depth peeling according to an embodiment of the subject matter described herein.

Moving into the glenoid and turning around gives an overview of the humeral head when using VDP, a view not possible with standard volume rendering (FIG. 22). Inspection of the humeral head from a different position reveals a Hill Sachs lesion. FIGS. 23A and 23B show views of this Hill Sachs lesion, shown in the circled region. FIG. 23A is a view created using standard volume rendering. Once again, the viewpoint is constrained to a position very close to the lesion. FIG. 23B is a view created using VDP, more effectively demonstrating that the lesion cuts across the entire face of the humeral head, a fact not appreciated with either MRI slice viewing or standard VA.

Exemplary Implementation

Figure 24:
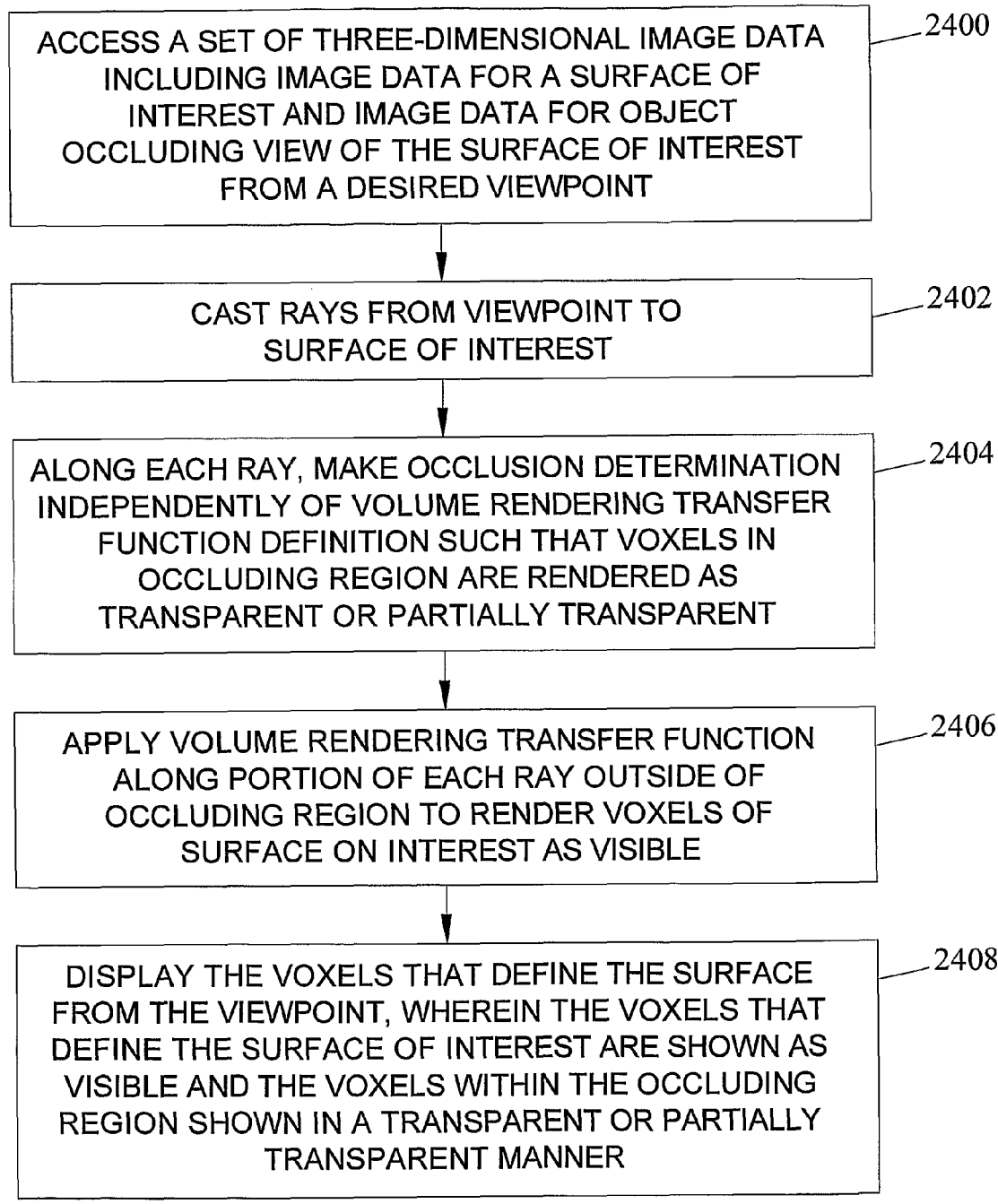
FIG. 24 is a flow chart illustrating exemplary steps for processing three-dimensional image data to render an image from a viewpoint within or beyond an occluding region of the image data according to an embodiment of the subject matter described herein.

The subject matter described herein for processing three dimensional image data to render an image from a viewpoint within or beyond an occluding region of the image data can be implemented using hardware, software, firmware, or any combination thereof. FIG. 24 is a flow chart illustrating exemplary steps for processing a three-dimensional image data to render an image from a viewpoint within or beyond an occluding region of the image data. Referring to FIG. 24, in step 2400, a set of three-dimensional image data including image data for a surface of interest and image data for a region occluding the surface of interest from a desired viewpoint is accessed. The set of three-dimensional image data may be a set of MRI slices, CT slices, datasets computed from MRI or CT data, or any combination of these. In step 2402, a plurality of rays is cast from the viewpoint to the surface of interest. In step 2404, along each ray, an occlusion determination is made independently from a volume rendering transfer function definition to render voxels in the occluding region as transparent or partially transparent. In step 2406, the volume rendering transfer function is applied along the portion of each ray outside of the occluding region to render voxels of the surface of interest as visible. In step 2408, the voxels that define the surface of interest are displayed as visible. The voxels within the occluding region are shown as transparent or partially transparent.

Although the steps in FIG. 24 relate to rendering an image of a surface of interest, the subject matter described herein is not limited to rendering physical outer surfaces of objects. "Surface," as used herein, is intended to refer to any layer of an image that is desired to be rendered, including layers beneath the physical outer surface of an object. The subject matter described herein may also be used to render regions or volumes that include or that are defined by surfaces. For example, rather than rendering only the outer surface of cartilage attached to the humeral head, the subject matter described herein may be used to render a region within the cartilage to look for abnormalities beneath the surface.

Figure 25:
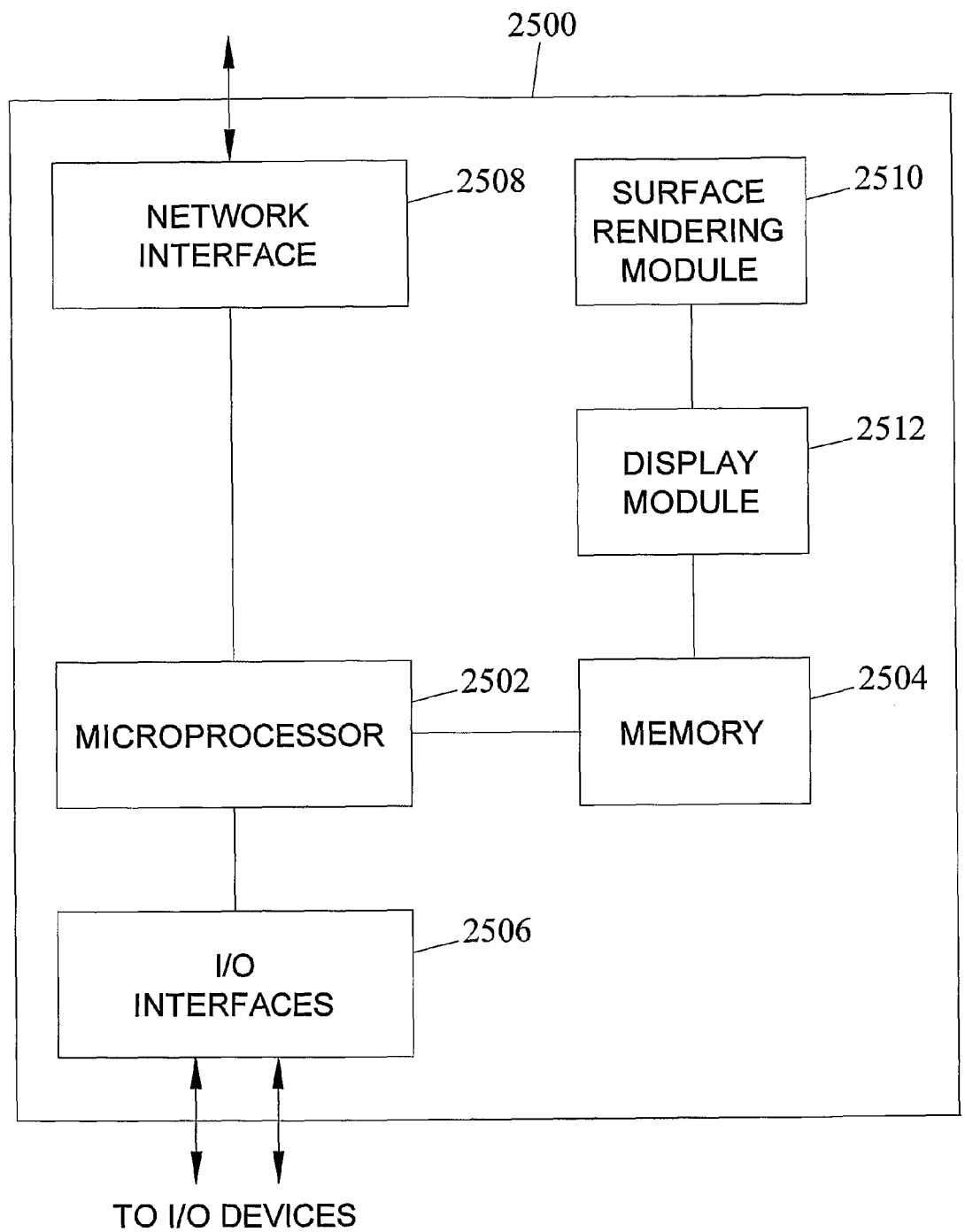
FIG. 25 is a block diagram illustrating exemplary components of a system for processing three-dimensional image data to render an image from a viewpoint within or beyond an occluding region of the image according to an embodiment of the subject matter described herein.

FIG. 25 is a block diagram illustrating an exemplary hardware and software architecture for implementing the method illustrated in FIG. 24. Referring to FIG. 25, a computer 2500 may be any suitable general-purpose computing platform. In the illustrated example, computer 2500 includes a microprocessor 2502, memory 2504, I/O interfaces 2506, and a network interface 2508. Microprocessor 2502 may control the overall operations of computer 2500 and execute instructions stored in memory 2504. I/O interfaces 2506 may control I/O functions of devices, such as displays and keyboards. Network interface 2508 may communicate with other computers via a network.

A surface rendering module 2510 and a display module 2512 may implement the steps illustrated in FIG. 24. More particularly, surface rendering module 2510 may perform the steps of accessing three-dimensional image data, allowing the user to select a viewpoint via I/O interfaces 2506, making the occlusion determination, and applying the transfer function. Surface rendering module 2510 may implement any of the steps described herein for volumetric depth peeling, flexible occlusion rendering, second surface rendering, diagnostic rays, or any of the enhancements thereof described herein. Display module 2512 may display the surface rendered by surface rendering module 2510.

Surface rendering module 2510 and display module 2512 may be programs resident memory as indicated by the broken line between memory 2504 and display module 2512 in FIG. 25. Alternatively, either or both of these modules may be implemented in graphics hardware or firmware.

SUMMARY AND CONCLUSIONS

VDP is a technique for automatically displaying otherwise occluded features of interest in volume data sets. VDP is a simple addition to current volume rendering systems that requires no pre-segmentation and solves visibility problems due to single, multiple, and self-occlusion. VDP is independent of transfer function definition, leaving available the full range of transfer function effects. Additional effects can be generated by discarding or modulating accumulated color and opacity and discarding or displaying non-culled rays. VDP was developed for medical applications, but has been demonstrated on other volume data sets.

VDP has been used for displaying various data sets, including MRI images of various joints, and CT images of the urinary system. VDP of MRI images of shoulders met its design goal of enabling collaborating physicians to rapidly determine pathology within the shoulder and has been extended to enable rapid survey of bone fracture and kidney collection systems.

A video demonstrating VDP on a shoulder MRI dataset is located at http://www.cs.unc.edu/~borland/VDP/VDP.mpg, the content of which is incorporated herein by reference in its entirety.

Enhancements

One potential limitation of the prototype implementation of VDP is that a fixed threshold does not always produce a complete surface in areas where the two surfaces are touching or close to touching. Due to partial-volume effects (averaging over voxels during the MRI acquisition), it is possible that even in areas where there is no physical contact between the two surfaces, the resolution of the MRI scan may not be sufficient to define a threshold as high as in other areas of the volume. In this case, artifacts resembling holes in the surface appear. Such configurations are also problematic for isosurface and presegmentation techniques. As described above, to eliminate "hole" problem, more sophisticated opacity functions can be used, involving both gradients and intensities, to address this case. This approach is the equivalent of using multi-dimensional transfer functions for opacity.

In one exemplary implementation, VDP uses a software volume renderer. It would be interesting to adapt the algorithm to run on Graphics Processing Units (GPUs). Currently, a single WEDESS MRI sequence is used for determining the appearance and visibility of the shoulder joint data. It may prove useful to incorporate other sequences to aid in determining volume boundaries. Full studies of MRI data of other joints, such as hips, wrists, ankles, and elbows are also planned, as are studies of CT urograms and bone fractures. VDP may also prove useful for other virtual-oscopy techniques, such as bronchoscopy and colonoscopy, as well as any discipline that uses volume rendering to view data where occlusion is a problem, such as geological surveying.

REFERENCES

The disclosures of all of the publications referenced herein are hereby incorporated herein by reference in their entireties.
1. G. R. Applegate. American Journal of Radiology, (171): 231-241, 1998.
2. E. M. Caoili, R. H. Cohan, et al. Urinary tract abnormalities: initial experience with multi-detector row CT urography. Radiology, 222:353-360, 2002.
3. J. Choi, B. Shin, et al. Efficient Volumetric Ray Casting for Isosurface Rendering. Computers & Graphics, 24(4), 2000.
4. P. Diefenbach. Pipeline Rendering: Interaction and Realism Through Hardware-Based Multi-Pass Rendering. University of Pennsylvania, Department of Computer Science, Ph.D. dissertation, 1996.
5. J. Diepstraten, D. Weiskopf, and T. Ertl. Transparency in interactive technical illustration. Computer Graphics Forum, 21(3), 2002.
6. J. Diepstraten, D. Weiskopf, and T. Ertl. Interactive cutaway illustrations. Computer Graphics Forum, 22(3):523-532, 2003.
7. D. Ebert, P. Rheingans. Volume Illustration: Non-Photorealistic Rendering of Volume Models. Proceedings of IEEE Visualization 2000, IEEE Computer Society Press, pages 195-202, 2000.
8. C. Everitt. Interactive Order-independent Transparency. Tech Report, Nvidia Corporation, 2002.
9. J. R. Fielding, L. Hoyte, et al. Tumor Detection by Virtual Cystoscopy with Color Mapping of Bladder Wall Thickness. Journal of Urology, 167:559-562, 2002.
10. C. L. Gray Sears, J. F. Ward, et al. Prospective comparison of computerized tomography and excretory urography in the initial evaluation of asymptomatic microhematuria. Journal of Urology, 168:2457-2460, 2002.
11. M. Hadwiger, C. Berger, et al. High-Quality Two-Level Volume Rendering of Segmented Data Sets on Consumer Graphics Hardware. IEEE Visualization 2003, Seattle, pages 301-308, 2003
12. B. M. Hemminger, P. L. Molina, et al. Clinical Applications of real-time volume rendering. SPIE Medical Imaging, 2431.1995.
13. J. Hladuvka, A. Konig, and E. Groller, Curvature-based transfer functions for direct volume rendering. Proceedings of SCCG 2000, pages 58-65, 2000.
14. D. Honigmann, J. Ruisz, and C. Haider. Adaptive design of a global opacity transfer function for direct volume rendering of ultrasound data. IEEE Visualization 2003, Seattle, pages 489-496. 2003.
15. V. Interrante, H. Fuchs, and S. Pizer. Conveying the 3d shape of smoothly curving transparent surfaces via texture. IEEE Transactions on Visualization and Computer Graphics, 3(2):98-117, 1997.
16. A. E. Kaufman, S. Lakare, et al. Virtual Colonoscopy. Communications of the ACM, 48(2):37-41, 2005.
17. G. Kindlmann and J. Durkin. Semi-automatic generation of transfer functions for direct volume rendering. Proceedings of IEEE Symposium on Volume Visualization 1998, pages 79-86, 1998.
18. G. Kindlmann, R. Whitaker, et al. Curvature-based transfer functions for direct volume rendering: Methods and applications. IEEE Visualization 2003, Seattle, pages 512-520, 2003
19. J. Kniss, G. Kindlmann, and Ch. Hansen. Interactive volume rendering using multi-dimensional transfer functions and direct manipulation widgets. IEEE Visualization 2001, San Diego, pages 255-262, 2001.
20. J. Kniss, S. Premoze, et al. Gaussian transfer functions for multi-fields volume visualization. IEEE Visualization 2003, Seattle, Wash., pages 497-504, 2003.
21. J. Kruger and R. Westermann. Acceleration techniques for GPU-based volume rendering. IEEE Visualization 2003, Seattle, Wash., pages 287-292, 2003.
22. M. Levoy. Display of surfaces from volume data. IEEE Computer Graphics and Applications, 8(3):29-37, 1988.
23. C. Lin and Y. Ching. An Efficient Volume Rendering Algorithm with an Analytic Approach. The Visual Computer, 12(10):515-526, 1996.
24. A. Mammen. Transparency and Antialiasing Algorithms Implemented with the Virtual Pixel Maps Technique," IEEE Computer Graphics and Applications, 9(4):43-55, July/August 1989.
25. M. M. McNicholas, V. D. Raptopoulus, et al. Excretory phase CT urography for opacification of the urinary collecting system. American Journal of Radiology, 170:1261-1267, 1998.
26. J. D. McTavish, M. Jinzaki, et al. Multi-detector row CT urography: comparison of strategies for depicting the normal urinary collecting system. Radiology, 225:787-790, 2002.
27. S. Parker, S. Shirley, et al. Interactive Ray Tracing for Isosurface ray casting. IEEE Visualization 1998, pages 233-238, 1998.

28. P. Rheingans. Opacity-modulating triangular textures for irregular surfaces. Proceedings of Visualization '96, pages 219-ff. IEEE Computer Society, 1996.
29. Sahin, et al. Skeletal Radiology, (33) 9-14, 2004.
30. A. Sherbondy, A., M Houston, et al. Fast volume segmentation with simultaneous visualization using programmable graphics hardware. IEEE Visualization 2003, Seattle, Wash., pages 171-176. 2003.
31. D. Stoller, P. Tirman. Diagnostic Imaging: Orthopaedics. Amirsys, 2004.
32. R. Tam, C. G. Healey, et al. Volume visualization of abdominal aortic aneurysms. Visualization '97, Phoenix, Ariz., pages 43-50, 1997.
33. M. Tory, S. Potts, et al. A parallel coordinates style interface for exploratory volume visualization. IEEE Transactions on Visualization and Computer Graphics, 11 (1):71-80. 2005.
34. I. Viola, A. Kanitsar, M. E. Groller, Importance-Driven Volume Rendering. IEEE Visualization 2004, Austin, Tex., pages 139-145.
35. M. Wan, Q. Tand, et al. Volume rendering based interactive navigation within the human colon. IEEE Visualization '99, San Francisco, Calif., IEEE Press. Pages 397-400, 1999.
36. M. D. Weishaupt, et al. Journal of MR Imaging (9):757-760, 1999.
37. W. Lee, et al, Korean Journal of Radiology, 5(1):47-54, 2004.
38. Z. Nagy, R. Klein. Depth-Peeling for Texture-Based Volume Rendering. 11th Pacific Conference on Computer Graphics and Applications, page 429, 2003.
39. K. J. Zuiderveld, P. M. A. v. Ooijen, et al. Clinical evaluation of interactive volume visualization. IEEE Visualization, San Francisco, Calif. pages 367-370.1996

It will be understood that various details of the invention may be changed without departing from the scope of the invention. Furthermore, the foregoing description is for the purpose of illustration only, and not for the purpose of limitation.

What is claimed is:

1. A method for processing three-dimensional image data to render an image from a viewpoint within or beyond an occluding region of the image data, the method comprising: at a computing platform including a processor:
   (a) receiving a set of three-dimensional image data including image data for a surface of interest and image data for a region occluding the surface of interest from a desired viewpoint;
   (b) casting a plurality of rays from the viewpoint to the surface of interest;
   (c) along each ray, making an occlusion determination independently from a volume rendering transfer function definition to render voxels within the occluding region as transparent or partially transparent;
   (d) applying the volume rendering transfer function along a portion of each ray outside of the occluding region to render voxels defining the surface of interest as visible; and
   (e) displaying the voxels that define the surface of interest from the viewpoint, wherein the voxels within the occluding region are shown in a transparent or partially transparent manner and wherein the voxels that define the surface of interest are shown as visible, wherein applying a transfer function includes applying a first transfer function to render the voxels of the surface of interest as visible and applying a second transfer function different from the first transfer function to render the voxels of the occluding region as transparent or partially transparent.

2. The method of claim 1 wherein accessing a set of three-dimensional image data includes accessing a set of magnetic resonance imaging (MRI) image data.

3. The method of claim 1 wherein accessing a set of three-dimensional image data includes accessing a set of computerized tomography (CT) image data.

4. The method of claim 1 wherein accessing a set of three-dimensional image data includes accessing a set of magnetic resonance imaging (MRI) and a set of computerized tomography (CT) image data of the same surface.

5. The method of claim 4 wherein making the occlusion determination includes analyzing vexel intensities along each ray in the CT image data to determine where to begin rendering the surface of interest along each ray in the MRI image data.

6. The method of claim 4 wherein making the occlusion determination includes analyzing voxel intensities along each ray in the MR image data to determine where to begin rendering the surface along each ray in the CT image data.

7. The method of claim 1 wherein accessing a set of three-dimensional image data includes accessing first and second sets of magnetic resonance imaging (MRI) images, wherein making the occlusion determination includes making the occlusion determination in the first set of MRI images, and wherein applying the transfer function includes applying the transfer function to the second set of MRI images.

8. The method of claim 1 wherein accessing a set of three-dimensional image data includes accessing first and second sets of computerized tomography (CT) images, wherein making the occlusion determination includes making the occlusion determination in the first set of CT images, and wherein applying the transfer function includes applying the transfer function to the second set of CT images.

9. The method of claim 1 wherein accessing a set of three-dimensional image data includes accessing a set of filtered image data and a set of unfiltered image data of the same surface and wherein making an occlusion determination includes analyzing voxel intensities along each ray in the filtered image data to identify locations for rendering the surface of interest along each ray in the unfiltered image data.

10. The method of claim 1 wherein making an occlusion determination includes defining a fixed voxel intensity threshold that distinguishes between voxels within the occluding region and voxels that define the surface and using the threshold to determine a location along each ray to begin accumulating voxel color and intensity for the surface of interest.

11. The method of claim 1 wherein making an occlusion determination includes calculating a voxel intensity gradient along each ray, distinguishing between voxels of the occluding object and voxels of the surface of interest based on a rate of change in voxel intensity along each ray, and identifying a location to begin rendering the voxels of the surface of interest in response to the rate of change reaching or exceeding a threshold value.

12. The method of claim 1 wherein making an occlusion determination includes:
   (a) accumulating voxel color and intensity along a ray;
   (b) identifying a voxel along the ray having an intensity that meets or exceeds a threshold value; and
   (c) in response to identifying the voxel having an intensity that meets or exceeds the threshold value, setting intensities and colors for voxels along the ray prior to reaching the voxel having the intensity that meets or exceeds the threshold value as transparent or partially transparent.

13. The method of claim 1 wherein applying a transfer function includes setting the transfer function to begin collecting voxel intensity and color upon reaching an nth surface of a plurality of surfaces of the same or similar voxel intensities, n being an integer.

14. The method of claim 13 wherein the nth surface comprises a last surface of the plurality of surfaces.

15. The method of claim 13 wherein the nth surface comprises a surface between a first and last surface of the plurality of surfaces.

16. The method of claim 1 wherein the three-dimensional image data comprises medical image data.

17. The method of claim 1 wherein the three-dimensional image data comprises non-medical image data.

18. The method of claim 1 wherein the surface of interest comprises a surface having a predetermined property and being surrounded by another surface and wherein displaying the surface of interest as visible includes displaying the surrounding surface as transparent or partially transparent and displaying the surface of interest in a color different from colors of surfaces that do not have the property.

19. The method of claim 1 wherein rendering the surface of interest as visible includes rendering a region that includes the surface of interest as visible.

20. The method of claim 1 wherein the viewpoint is within the occluding region.

21. The method of claim 1 wherein the viewpoint is beyond the occluding region.

22. A system for processing three-dimensional image data to render an image from a viewpoint within or beyond an occluding region of the image data, the method comprising:
 (a) a surface rendering module for accessing a set of three-dimensional image data including image data for a surface of interest and image data for a region occluding the surface of interest from a desired viewpoint and for:
  (i) casting a plurality of rays from the viewpoint to the surface of interest;
  (ii) along each ray, making an occlusion determination independently from a volume rendering transfer function definition to render voxels within the occluding region as transparent or partially transparent; and
  (iii) applying the volume rendering transfer function along a portion of each ray outside of the occluding region to render voxels defining the surface of interest as visible, wherein the surface rendering module is adapted to apply a first transfer function to render the voxels of the surface of interest as visible and to apply a second transfer function different from the first transfer function to render the voxels of the occluding region as transparent or semi-transparent; and
 (b) a display module for displaying the voxels that define the surface of interest from the viewpoint as visible and for displaying the voxels within the occluding region as transparent or partially transparent.

23. The system of claim 22 wherein the surface rendering module is adapted to access a set of magnetic resonance imaging (MRI) image data.

24. The system of claim 22 wherein the surface rendering module is adapted to access a set of computerized tomography (CT) image data.

25. The system of claim 22 wherein the surface rendering module is adapted to access a set of magnetic resonance imaging (MRI) and a set of computerized tomography (CT) image data of the same surface.

26. The system of claim 25 wherein the surface rendering module is adapted to analyze voxel intensities along rays cast from the viewpoint to the surface in the CT image data to determine where to begin rendering the surface of interest along each ray in the MRI image data.

27. The system of claim 25 wherein the surface rendering module is adapted to analyze voxel intensities along rays case form the viewpoint in the MRI image data to determine where to begin rendering the surface along each ray in the CT image data.

28. The system of claim 22 wherein the surface rendering module is adapted to access first and second sets of magnetic resonance imaging (MRI) images, to make the occlusion determination using the first set of MRI images, and to apply the transfer function to the second set of MRI images.

29. The system of claim 22 wherein the surface rendering module is adapted to access first and second sets of computerized tomography (CT) images, to make the occlusion determination using the first set of CT images, and to apply the transfer function to the second set of CT images.

30. The system of claim 22 wherein the surface rendering module is adapted to access a set of filtered image data and a set of unfiltered image data of the same surface, to identify a location of the surface of interest along each ray using the filtered image data, and to render the surface in the unfiltered image data based on the locations identified using the filtered image data.

31. The system of claim 22 wherein surface rendering module is adapted to define a fixed voxel intensity threshold that distinguishes between voxels within the occluding region and voxels that define the surface and to use the threshold to determine a location along each ray to begin accumulating voxel color and intensity for the surface of interest.

32. The system of claim 22 wherein the surface rendering module is adapted to calculate a voxel intensity gradient along each ray, to distinguish between voxels of the occluding region and voxels of the surface of interest based on a rate of change in voxel intensity along each ray, and to begin rendering the voxels of the surface of interest when the rate of change reaches or exceeds a threshold value.

33. The system of claim 22 wherein the surface rendering module is adapted to:
 (a) accumulate voxel color and intensity along a ray;
 (b) identify a voxel along the ray having an intensity that meets or exceeds a threshold value;
 (c) in response to identifying the voxel having an intensity that meets or exceeds the threshold value, set intensities and colors for voxels along the ray prior to reaching the voxel having the intensity that meets or exceeds the threshold value as transparent or partially transparent; and
 (d) accumulate intensity and color for voxels on a far side of the voxel having the intensity that meets or exceeds the threshold.

34. The system of claim 22 wherein the surface rendering module is adapted to set the transfer function to begin collecting voxel intensity and color upon reaching an nth surface of a plurality of surfaces of the same or similar voxel intensities, n being an integer.

35. The system of claim 22 wherein the three-dimensional image data comprises medical image data.

36. The system of claim 22 wherein the three-dimensional image data comprises non-medical image data.

37. The system of claim 22 wherein the surface of interest comprises a surface having a predetermined property and being surrounded by another surface and wherein the display module is adapted to display the surrounding surface as transparent or partially transparent and to display the surface of interest in a color different from colors of surfaces that do not have the property.

38. The system of claim 22 wherein rendering the surface of interest as visible includes rendering a region that includes the surface of interest as visible.

39. The system of claim 22 wherein the viewpoint is within the occluding region.

40. The system of claim 22 wherein the viewpoint is beyond the occluding region.

41. A non-transitory computer program product comprising computer-executable instructions embodied in a computer-readable medium for performing steps comprising:
   (a) receiving a set of three-dimensional image data including image data for a surface of interest and image data for a region occluding the surface of interest from a desired viewpoint;
   (b) casting a plurality of rays from the viewpoint to the surface of interest;
   (c) along each ray, making an occlusion determination independently from a volume rendering transfer function definition to render voxels within the occluding region as transparent or partially transparent;
   (d) applying the volume rendering transfer function along a portion of each ray outside of the occluding region to render voxels defining the surface of interest as visible; and
   (e) displaying the voxels that define the surface of interest from the viewpoint, wherein the voxels within the occluding region are shown in a transparent or partially transparent manner and wherein the voxels that define the surface of interest are shown as visible, wherein applying a transfer function includes applying a first transfer function to render the voxels of the surface of interest as visible and applying a second transfer function different from the first transfer function to render the voxels of the occluding region as transparent or partially transparent.

* * * * *

UNITED STATES PATENT AND TRADEMARK OFFICE
CERTIFICATE OF CORRECTION

| | | |
|---|---|---|
| PATENT NO. | : 8,150,111 B2 | Page 1 of 1 |
| APPLICATION NO. | : 11/886207 | |
| DATED | : April 3, 2012 | |
| INVENTOR(S) | : Borland et al. | |

It is certified that error appears in the above-identified patent and that said Letters Patent is hereby corrected as shown below:

Col. 1, line 17 replace "This invention was made with U.S. Government support under Grant No. P41 EB002025-21 RS/RMT awarded by the National Institutes of Health. Accordingly, the U.S. Government has certain rights in the invention."

with --This invention was made with government support under Grant No. P41 EB002025-21 awarded by the National Institutes of Health. The government has certain rights in the invention.--

Signed and Sealed this
Thirty-first Day of July, 2012

David J. Kappos
*Director of the United States Patent and Trademark Office*